(12) United States Patent
Burni et al.

(10) Patent No.: US 12,203,029 B2
(45) Date of Patent: Jan. 21, 2025

(54) SELF-DEGRADING ORGANOGELS

(71) Applicants: University of Maryland, College Park, College Park, MD (US); BP Exploration Operating Company Limited, Middlesex (GB)

(72) Inventors: Faraz A. Burni, Silver Spring, MD (US); Srinivasa R. Raghavan, Columbia, MD (US); Joseph Wee, Middlesex (GB); David Chappell, Middlesex (GB); Shanshan Huang, Middlesex (GB)

(73) Assignees: University of Maryland, College Park, College Park, MD (US); BP Exploration Operating Company Limited, Middlesex (GB)

( * ) Notice: Subject to any disclaimer, the term of this patent is extended or adjusted under 35 U.S.C. 154(b) by 0 days.

(21) Appl. No.: 18/173,550

(22) Filed: Feb. 23, 2023

(65) Prior Publication Data
US 2023/0279282 A1  Sep. 7, 2023

Related U.S. Application Data

(60) Provisional application No. 63/313,116, filed on Feb. 23, 2022.

(51) Int. Cl.
*C09K 8/42* (2006.01)
*C09K 8/03* (2006.01)
(Continued)

(52) U.S. Cl.
CPC ............ *C09K 8/035* (2013.01); *C09K 8/032* (2013.01); *C09K 8/426* (2013.01); *E21B 21/003* (2013.01); *E21B 33/138* (2013.01)

(58) Field of Classification Search
None
See application file for complete search history.

(56) References Cited

U.S. PATENT DOCUMENTS 3,208,524 A   9/1965  Horner et al.
5,346,694 A   9/1994  Juneja
(Continued)

FOREIGN PATENT DOCUMENTS

CN   1749315 A    3/2006
CN   103087484 A  5/2013
(Continued)

OTHER PUBLICATIONS

Basrur, V.R., et al., "Synergistic gelation of silica nanoparticles and a sorbitol-based molecular gelator to yield highly-conductive free-standing gel electrolytes," ACS Appl. Mater. Interfaces 5(2):262-267, American Chemical Society, United States (Jan. 2013).
(Continued)

*Primary Examiner* — Andrew Sue-Ako
(74) *Attorney, Agent, or Firm* — Sterne, Kessler, Goldstein & Fox P.L.L.C.

(57) ABSTRACT

The problem of lost circulation is pertinent to the oil industry. To prevent fluid loss, a lost circulation material (LCM), or more generally, a plugging material, can be used to effectively plug the fractures in the rock formation. If the fractures are in the production zone, it is also ideal to unplug them when the drilling operation is complete. Therefore, a material engineered to degrade after a desired period would be useful. In examples, a plugging material has been developed by gelling an oil-based fluid using a low molecular weight gelator, dibenzylidene sorbitol (DBS). DBS gels are robust and show plugging behavior. DBS is shown to chemically degrade in presence of an acid. Hence, a self-degrading gel can be synthesized by incorporating an acid into the system. Further, by varying the type and concen-
(Continued)

tration of the acid, the degradation time of the gel can be controlled.

18 Claims, 28 Drawing Sheets

(51) Int. Cl.
    *C09K 8/035*     (2006.01)
    *E21B 21/00*     (2006.01)
    *E21B 33/138*     (2006.01)

(56) References Cited

U.S. PATENT DOCUMENTS

| | | | |
|---|---|---|---|
| 5,490,979 A | 2/1996 | Kasat et al. | |
| 5,609,855 A | 3/1997 | Oh et al. | |
| 6,238,615 B1* | 5/2001 | Kobayashi | C08K 5/1575 524/109 |
| 6,245,843 B1* | 6/2001 | Kobayashi | C08K 5/0008 524/109 |
| 2005/0100572 A1 | 5/2005 | Hatajima et al. | |
| 2006/0135372 A1* | 6/2006 | Hossaini | C09K 8/52 507/200 |
| 2007/0032386 A1* | 2/2007 | Abad | C09K 8/508 507/201 |
| 2010/0240569 A1 | 9/2010 | Boutique et al. | |
| 2014/0174742 A1 | 6/2014 | Mirakyan et al. | |
| 2014/0353042 A1 | 12/2014 | Karale et al. | |
| 2015/0344767 A1 | 12/2015 | Lei et al. | |
| 2019/0077940 A1* | 3/2019 | Deans | C08L 55/02 |

FOREIGN PATENT DOCUMENTS

| | | |
|---|---|---|
| CN | 105504727 A | 4/2016 |
| CN | 106085388 B | 9/2018 |
| CN | 109666470 A | 4/2019 |
| CN | 110540831 A | 12/2019 |
| CN | 111138812 A | 5/2020 |
| CN | 111423706 A | 7/2020 |
| JP | 2008222759 A | 9/2008 |
| WO | WO-2023164561 A1 | 8/2023 |

OTHER PUBLICATIONS

Boukadi, F., et al., "A Comparative Study of Lost Circulation Materials," Energy Sources 26(11):1043-1051, Taylor and Francis Ltd., United Kingdom (Sep. 2004).

Chang, R.X., et al., "Easy degradable polymeric gel with extremely base-labile cross-linking," Polymer 60:62-68, Elsevier BV, Netherlands (Mar. 2015).

Colomb, J., et al., "Self-degrading, MRI-detectable hydrogel sensors with picomolar target sensitivity," Magn. Reson. Med. 64(6):1792-1799, John Wiley & Sons Inc., United States (Dec. 2010).

Diehn, K.K., et al., "Insights into organogelation and its kinetics from Hansen solubility parameters. Toward a priori predictions of molecular gelation," Soft Matter 10(15):2632-2640, Royal Society of Chemistry, United Kingdom (Apr. 2014).

Elkatatny, S., et al., "A Novel Solution for Severe Loss Prevention While Drilling Deep Wells," Sustainability 12(4):1339, MDPI AG, Switzerland (Feb. 2020).

Gamage, P., and Deville, J., "Self-Degrading Gel for Downhole Applications in High Temperature Reservoirs," American Association of Drilling Engineers, United States (Feb. 2013).

Gaurina-Medimurec, N., et al., "Drilling Fluid and Cement Slurry Design for Naturally Fractured Reservoirs," Appl. Sci. 11(2):767, MDPI, Switzerland (Jan. 2021).

Guo, B., and Ma, P.X., "Synthetic biodegradable functional polymers for tissue engineering: a brief review," Sci. China Chem. 57(4):490-500, Science Press, China (Apr. 2014).

Haring, M., and Diaz, D., "Supramolecular metallogels with bulk self-healing properties prepared by in situ metal complexation," Chem. Commun. (Camb) 52(89):13081, Royal Society of Chemistry, United Kingdom (Nov. 2016).

Hu, J., et al., "A thermo-degradable hydrogel with light-tunable degradation and drug release," Biomaterials 112:133-140, Elsevier BV, United Kingdom (Jan. 2017).

Hu, Y., et al., "A double-layer hydrogel based on alginate-carboxymethyl cellulose and synthetic polymer as sustained drug delivery system," Sci. Rep. 11(1):9142, Nature Publishing Group, United Kingdom (Apr. 2021).

International Search Report and Written Opinion for International Application No. PCT/US2023/063144, European Patent Office, Netherlands, mailed on Aug. 3, 2023, 17 pages.

John, J., et al., "Thermoreversible gelation and self-assembly behavior of dibenzylidene sorbitol in ternary solvent mixtures," Colloid and Polymer Science 297(4):493-502, Springer Verlag, Germany (Jan. 2019).

Ketner, A.M., et al., "A simple class of photorheological fluids: surfactant solutions with viscosity tunable by light," J. Am. Chem. Soc. 129(6):1553-1559, American Chemical Society, United States (Feb. 2007).

Kim, U.J., et al., "Enzymatic degradation of oxidized cellulose hydrogels," Polym. Degrad. Stab. 95(12):2277-2280, Elsevier, United Kingdom (Dec. 2010).

Kim, Y.K., and Kwon, Y.J., "Separation and recovery of nucleic acids with improved biological activity by acid-degradable polyacrylamide gel electrophoresis," Electrophoresis 31(10):1656-1661, Wiley-VCH, Germany (May 2010).

Lee, H.J., and Jeong, B., "ROS-Sensitive Degradable PEG-PCL-PEG Micellar Thermogel," Small 16(12):e1903045, Wiley-VCH Verlag, Germany (Mar. 2020).

Liu, S., et al., "Solvents effects in the formation and viscoelasticity of DBS organogels," Soft Matter 9(3):864-874, Royal Society of Chemistry, United Kingdom (Jan. 2013).

Lorenceau, E., et al., "Wetting of Fibers," in Molecular Gels: Materials with Self-Assembled Fibrillar Networks, Weiss, R.G., and Terech, P., ed., pp. 223-237, Springer Science+Business Media, Germany (2006).

Oh, H., et al., "Gelation of Oil upon Contact with Water: A Bioinspired Scheme for the Self-Repair of Oil Leaks from Underwater Tubes," Langmuir 31(19):5259-5264, American Chemical Society, United States (May 2015).

Okesola, B.O., et al., "1,3:2,4-Dibenzylidene-D-sorbitol (DBS) and its derivatives—efficient, versatile and industrially-relevant low-molecular-weight gelators with over 100 years of history and a bright future," Soft Matter 11(24):4768-4787, Royal Society of Chemistry, United Kingdom (Jun. 2015).

Piras, C.C., et al., "Hybrid Self-Assembled Gel Beads for Tuneable pH-Controlled Rosuvastatin Delivery," Chemistry 27(52):13203-13210, Wiley, United States (Sep. 2001).

Raghavan, S., and Cipriano, B.H., "Gel Formation: Phase Diagrams Using Tabletop Rheology and Calorimetry," in Molecular Gels: Materials with Self-Assembled Fibrillar Networks, Weiss, R.G., and Terech, P., ed., pp. 241-252, Springer Science+Business Media, Germany (2006).

Raghavan, S., and Douglas, J.F., "The conundrum of gel formation by molecular nanofibers, wormlike micelles, and filamentous proteins: Gelation without cross-links?" Soft Matter 8(33):8539-8546, Royal Society of Chemistry, United Kingdom (Aug. 2012).

Raghavan, S.R., et al., "Rheology of Silica Dispersions in Organic Liquids: New Evidence for Solvation Forces Dictated by Hydrogen Bonding," Langmuir 16(21):7920-7930, American Chemical Society, United States (Sep. 2000).

Shin, J., et al., "Bioresorbable pressure sensors protected with thermally grown silicon dioxide for the monitoring of chronic diseases and healing processes," Nat. Biomed. Eng. 3(1):37-46, Nature Publishing Group, United States (Jan. 2019).

Taylor, M.J., et al., "Thermoresponsive Gels," Gels 3(1):4, MDPI, Switzerland (Jan. 2017).

Wang, Y., et al., "Study of adhesive self-degrading gel for wellbore sealing," Colloids Surf. 651:129567, Elsevier, Netherlands (Oct. 2022).

(56) References Cited

OTHER PUBLICATIONS

Weiss, R., "Chapter 1:Introduction: An Overview of the "What" and "Why" of Molecular Gels," in Molecular Gels: Structure and Dynamics, vol. 25, Weiss, R.G., ed., pp. 1-27, Royal Society of Chemistry, United Kingdom (2018).

Wilder, E.A., et al., "Effects of Composition and Matrix Polarity on Network Development in Organogels of Poly(ethylene glycol) and Dibenzylidene Sorbitol," Langmuir 19(15):6004-6013, American Chemical Society, United States (Jun. 2003).

Zhang, J.Y., et al., "Polymer Gels," in Gel Chemistry: Interactions, Structures, and Properties, vol. 96, Zhang, J. ed., pp. 153-189, Springer, Singapore (2018).

Zhu, D.Y., et al., "Development of degradable pre-formed particle gel (DPPG) as temporary plugging agent for petroleum drilling and production," Pet. Sci. 18:479-494, China University of Petroleum Beijing, China (Apr. 2021).

* cited by examiner

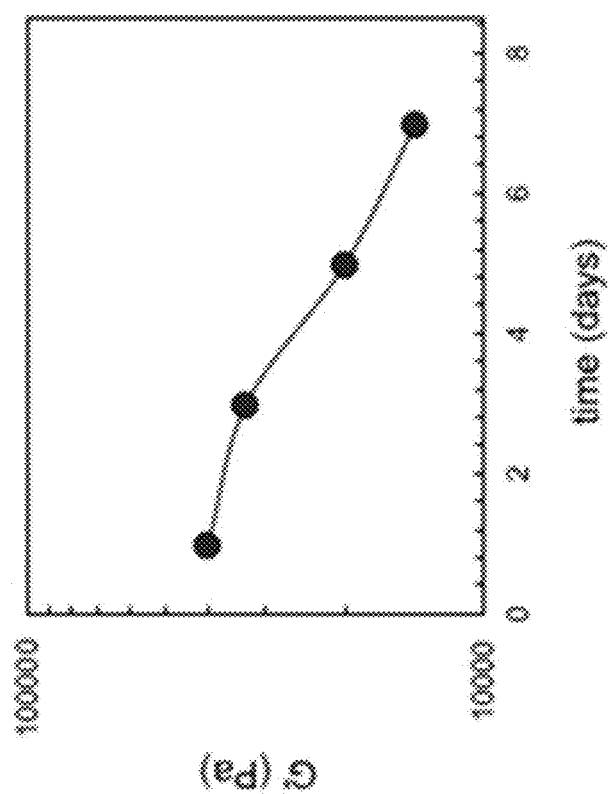
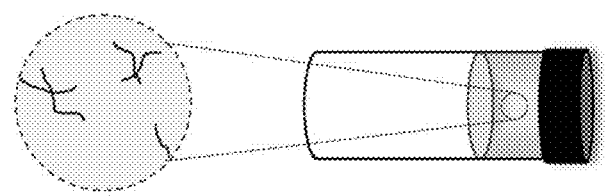
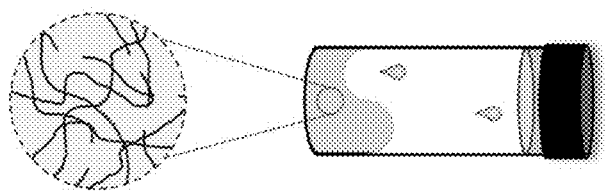
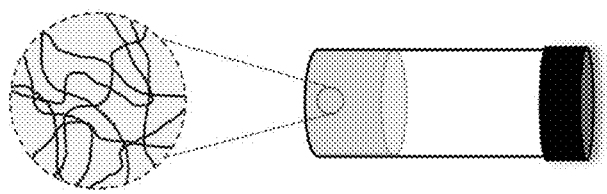
Fig. 8A
Fig. 8B

Degradation of DBS in Aqueous Acid

SELF-DEGRADING ORGANOGELS

OVERVIEW

Petroleum and its products are an integral part of modern society. To access petroleum, oil wells are dug in the ground. During the drilling operation, a fluid called the drilling fluid is circulated through the borehole. The drilling fluid facilitates the drilling process by bringing the rock cuttings to the surface, providing well stability, and cooling and lubricating the drill bit. Lavrov, A., *Lost circulation: Mechanisms and solutions*, Gulf Professional Publishing, Elsevier (2016). However, if undesired side fractures are present in the bedrock, they provide an escape route for the drilling fluid, which is then lost to the formation. This situation is called lost circulation and is one of the most severe, costly, and time-consuming problems of a drilling operation. Lavrov; Rabia, H., Oilwell drilling engineering: Principles and practice, Graham & Trotman, London (1985).

To mitigate fluid losses, one of the most conventional and widely used methods is to incorporate solid particles into the drilling fluid. White, Robert J. Lost-circulation Materials and their Evaluation, Paper presented at the Drilling and Production Practice, New York, New York, January 1956. These particulates, which could be anything from paper to chalk to food waste, are carried by the fluid into fractures where they accumulate and eventually plug the fractures. However, these conventional lost circulation materials (LCM) have limited flow blocking capability in large fractures. Boukadi, F., Yaghi, B., Al-Hadrami, H., Bemani, A., Babadagli, T., & De Mestre, P., "A Comparative Study of Lost Circulation Materials." *Energy Sources*, 26(11), 1043-1051 (2004).

In contrast to the conventional approaches, one or more embodiments of the present invention can be directed to a more reliable gel-based LCM. In addition to effective flow blocking, another important feature that can be exhibited by one or more embodiments is self-degradability. It is highly desirable to degrade the LCM once the drilling operation is complete since the fractures play an important role in the oil recovery process. Therefore, it is important to engineer a material that could effectively plug the fractures and then degrade after a controlled period of time. The degradation period needs to be controlled carefully as the LCM needs to be an effective plugging agent that lasts throughout the drilling of the wellbore, but not too long that it would hinder the ability to recover the oil during production.

A novel LCM has been developed by transforming an oil-based fluid into a gel. It was found that a food-grade compound, dibenzylidene sorbitol (DBS), causes the oil-based fluid to turn into a gel via self-assembly. DBS was selected since it is environmentally friendly, inexpensive compared to other low molecular weight gelators, and supplied by several vendors in bulk quantities. The gels formed by DBS are highly robust and can effectively plug the fractures. These gels are also degradable under acidic conditions. The degradation time can be controlled by the type and the concentration of the acid.

BRIEF SUMMARY

The present disclosure provides self-degrading gel compositions comprising a liquid, a gelator, and a degrading agent, wherein the degrading agent degrades the gelator over time.

In some embodiments, the gelator is a low molecular weight compound.

In some embodiments, the gelator is dibenzylidene sorbitol (DBS), methyl dibenzylidene sorbitol (methyl-DBS), dimethyl dibenzylidene sorbitol (dimethyl-DBS), any other functional derivative of dibenzylidene sorbitol, or a combination thereof.

In some embodiments, the gelator is DBS.

In some embodiments, the concentration of the gelator is from about 0.25 wt. % to about 15 wt. %.

In some embodiments, the concentration of the gelator is from about 0.25 wt. % to about 5 wt. %.

In some embodiments, the concentration of the gelator is from about 2 wt. % to about 4 wt. %.

In some embodiments, the concentration of the gelator is about 0.25 wt. %.

In some embodiments, the concentration of the gelator is about 0.5 wt. %.

In some embodiments, the concentration of the gelator is about 1 wt. %.

In some embodiments, the concentration of the gelator is about 2 wt. %.

In some embodiments, the concentration of the gelator is about 3 wt. %.

In some embodiments, the concentration of the gelator is about 4 wt. %.

In some embodiments, the degrading agent comprises one or more acids.

In some embodiments, the one or more acids is a mineral acid, an organic acid, a Lewis acid, or a combination thereof.

In some embodiments, the mineral acid is hydrochloric acid.

In some embodiments, the organic acid is butanoic acid, hexanoic acid, octanoic acid, decanoic acid, dodecanoic acid, citric acid, formic acid, or a combination thereof.

In some embodiments, the Lewis acid is aluminum(III) chloride or bismuth(III) triflate.

In some embodiments, the self-degrading gel composition further comprises a solvent.

In some embodiments, the solvent is dimethylsulfoxide (DMSO), dihydrolevoglucosenone (cyrene), dimethylformamide (DMF), N-methyl-2-pyrrolidone (NMP), or a combination thereof.

In some embodiments, the solvent is DMSO.

In some embodiments, a portion of the DMSO is encapsulated in wax particles.

In some embodiments, the liquid comprises an oil-based liquid or a water-based liquid.

In some embodiments, the oil-based liquid comprises mineral oil.

In some embodiments, the liquid further comprises hexanol, an organic acid, or a combination thereof.

In some embodiments, the liquid comprises from about 20 wt. % to about 80 wt. % mineral oil and from about 20 wt. % to about 80 wt. % hexanol, an organic acid, or a combination thereof.

In some embodiments, the liquid comprises from about 30 wt. % to about 50 wt. % mineral oil and from about 30 wt. % to about 50 wt. % hexanol.

The present disclosure also provides a method of preventing loss of a fluid within a rock formation, comprising the steps of:
  injecting the fluid into a borehole of the rock formation; and
  injecting a plugging material into the borehole, wherein the plugging material comprises a gelator that gels into a gel that plugs a fracture or pore space within the rock formation.

In some embodiments, the loss occurs before, during, or after a drilling operation.

In some embodiments, the plugging material is a lost circulation material.

In some embodiments, the fluid is a drilling fluid.

In some embodiments, the gelator gels into a self-degrading gel that degrades over time.

In some embodiments, the gelator gels into a self-degrading gel in a downhole portion of the borehole.

In some embodiments, the gel forms without heating.

In some embodiments, the plugging of the fracture is reversible.

In some embodiments, the gel plugs the fracture for from about 1 day to about 16 weeks.

In some embodiments, the gel plugs the fracture for from about 2 weeks to about 6 weeks.

In some embodiments, the plugging of the fracture is reversed by degradation of the gel.

In some embodiments, the fracture or pore space comprises oil, brine, or other reservoir fluids.

In some embodiments, the plugging of the fracture prevents the fluid from contacting the reservoir fluid.

In some embodiments, the fluid does not contact the reservoir fluid.

In some embodiments, the reservoir fluid is not contaminated by the drilling fluid.

The present disclosure also provides a method of improving recovery of reservoir fluid from a fracture or pore space comprising plugging the fracture or pore space with a self-degrading gel composition described herein.

BRIEF DESCRIPTION OF THE DRAWINGS

FIG. 8A is a schematic showing how a DBS gel is chemically degraded, eventually resulting in a thin solution.

FIG. 8B is a line graph showing the decrease in elastic modulus (G') over time as the DBS gel is degraded. The gel contained 0.5 wt % DBS and 20 wt. % hexanoic acid. The experiment was performed at 65° C.

DETAILED DESCRIPTION

Definitions

Figure 1:
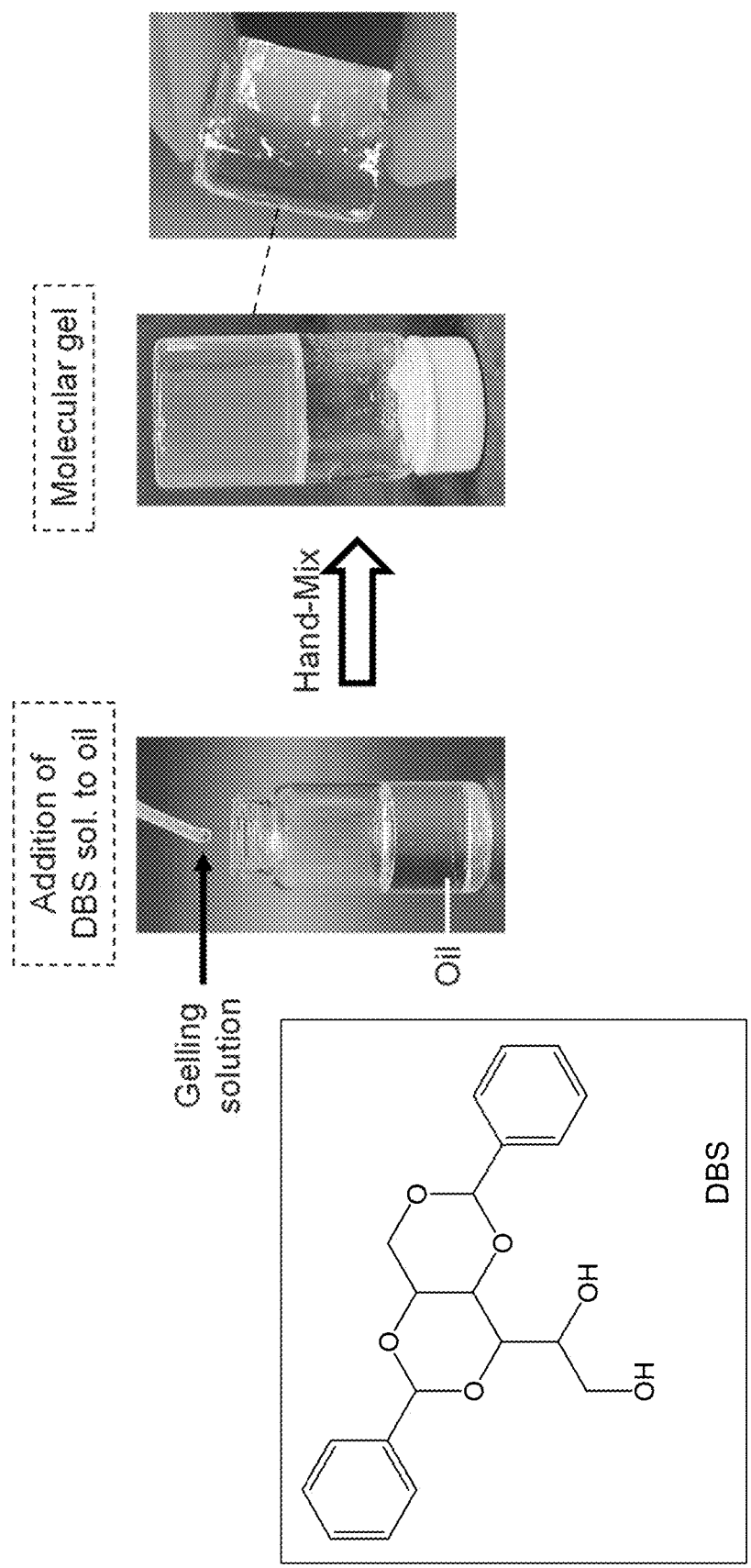
FIG. 1 is a schematic with photographs showing addition of a concentrated dibenzylidene sorbitol (DBS) solution in DMSO (gelling solution) to a base oil, whereupon mixing a DBS gel is obtained.

Unless defined otherwise, all technical and scientific terms used herein have the same meaning as commonly understood by one skilled in the art to which this disclosure belongs. In case of conflict, the present application including the definitions will control. Unless otherwise required by context, singular terms shall include pluralities, and plural terms shall include the singular.

The documents listed and/or referenced in the present disclosure are incorporated herein by reference each in their respective entirety, except for any statements contradictory to the express disclosure herein, except for subject matter disclaimers or disavowals, and except to the extent that the incorporated material is inconsistent with the express disclosure herein, in which case the language in this disclosure controls.

Incorporation by reference of any such documents shall not be considered an admission that the incorporated materials are prior art to the present disclosure, or considered as material to the patentability of the present disclosure.

Although methods and materials similar or equivalent to those described herein can be used in the practice or testing of the present disclosure, suitable methods and materials are described below. The materials, methods, and examples are illustrative only and are not intended to be limiting. Other features and advantages of the disclosure will be apparent from the detailed description and from the claims.

To further define this disclosure, the following terms and definitions are provided.

The singular forms "a," "an" and "the" include plural referents unless the context clearly dictates otherwise. The terms "a" (or "an"), as well as the terms "one or more," and "at least one" can be used interchangeably herein. In certain aspects, the term "a" or "an" means "single." In other aspects, the term "a" or "an" includes "two or more" or "multiple."

The term "about" is used herein to mean about, roughly, around, or in the region(s) of. When the term "about" is used in conjunction with a numerical range, it modifies that range by extending the boundaries above and below the numerical values set forth. In general, the term "about" is used herein to modify a numerical value above and below the stated value by a variance of 10 percent, up or down (higher or lower).

As used herein, the term "base oil" refers to a liquid to which a gelling solution is added to produce a gel. In addition to the base oil described above, any liquid comprising an oil (an "oil-based liquid") may be used, including oil-base liquids comprising different amounts of mineral oil and cosolvents, such as hexanol. Any liquid comprising water (a "water-based liquid") may also be used.

As used herein, the term "gelator" refers to any compound that forms a gel when exposed to stimuli, which include but are not limited to addition of a solvent or liquid, e.g., an oil-based liquid, an increase or decrease in temperature, or an increase or decrease in pressure.

As used herein, the term "gel" refers to a semi-solid substance that contains cross-linked material. In some embodiments, the cross-links are covalent bonds. In some embodiments, the cross-links are hydrogen bonds. In some embodiments, the cross-links are intermolecular forces.

As used herein, the term "gelling solution" refers to a solution that comprises a gelator.

As used herein, the term "mineral oil" refers to any mixture of higher alkanes from a mineral source, for example a distillate of petroleum, including diesel, or a similar synthetically-derived mixture, such as synthetic olefins (PAO).

As used herein, the term "fluid" refers to any liquid whose flow may be slowed or prevented by a plugging material. As used herein, the term "plugging material" refers to any material that can be used to slow or prevent the flow of a fluid. In some embodiments, the fluid is water. In some embodiments, the fluid is a drilling fluid. In some embodiments, the plugging material is a self-degrading gel described herein. In some embodiments, the plugging material is used to slow or prevent the flow of a fluid out of a borehole, e.g., a hole formed in a rock formation by drilling.

As used herein, the term "degrading agent" refers to any agent that, when added to a gel, results in the degradation of the gel into a liquid solution. In some embodiments, the degrading agent is an aqueous acid. In some embodiments, the degrading agent is a Lewis acid. In some embodiments, the degrading agent is a solvent.

Example Results & Discussion

Gel Preparation without Heat:

Typically, the preparation of low molecular weight gels requires heating to a very high temperature. But, heating the solvent requires high energy input and may be infeasible for large-scale industrial applications. Therefore, a method to synthesize DBS gels that does not involve heating was utilized. In some embodiments, a high concentration of DBS (e.g., 15 wt. %) is dissolved in dimethyl sulfoxide (DMSO) to produce a gelling solution. Then, a predetermined amount of this gelling solution is added to a base oil comprising mineral oil and a cosolvent (hexanol). The mixture is then lightly stirred and the gelation occurs in less than a minute. The synthesis method is depicted in FIG. 1. The cosolvent increases the solvent compatibility and helps facilitate formation of a homogeneous gel. A base oil composition of 80 wt. % mineral oil and 20 wt. % hexanol was selected. The gels formed by the conventional heating method and the non-heating method were then compared using dynamic rheology. The results show no significant difference in the elastic moduli (G') for both gels. Using a similar method, gels of other low molecular weight gelators or other derivatives of DBS (e.g., methyl-DBS or dimethyl-DBS) can also be synthesized. Other gelators besides DBS may be used.

FIG. 1 shows a synthesis method of DBS gel without heat. Concentrated DBS solution in DMSO (gelling solution) is added to base oil. Upon mixing, robust DBS gels are obtained.

Figure 2B:
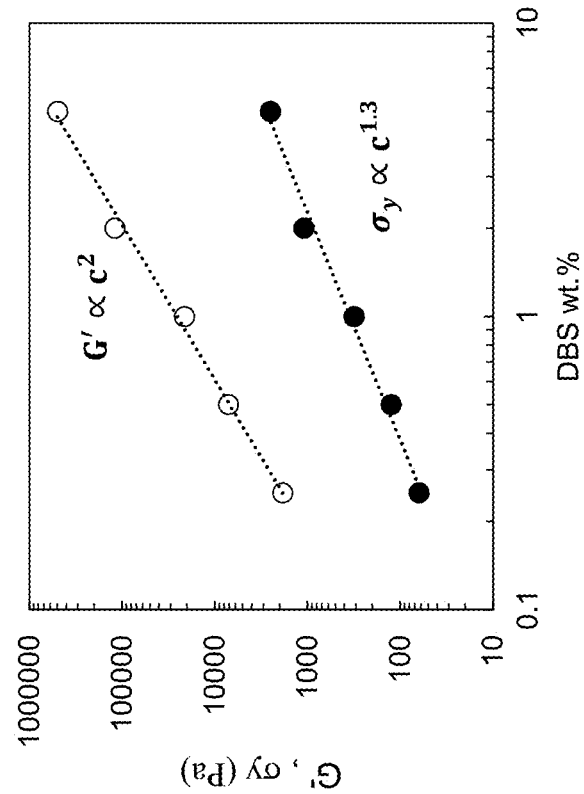
FIG. 2B is a line graph showing the dependence of elastic moduli (G') and yield stress ($\sigma_y$) on the DBS concentration in the gel.
Figure 2A:
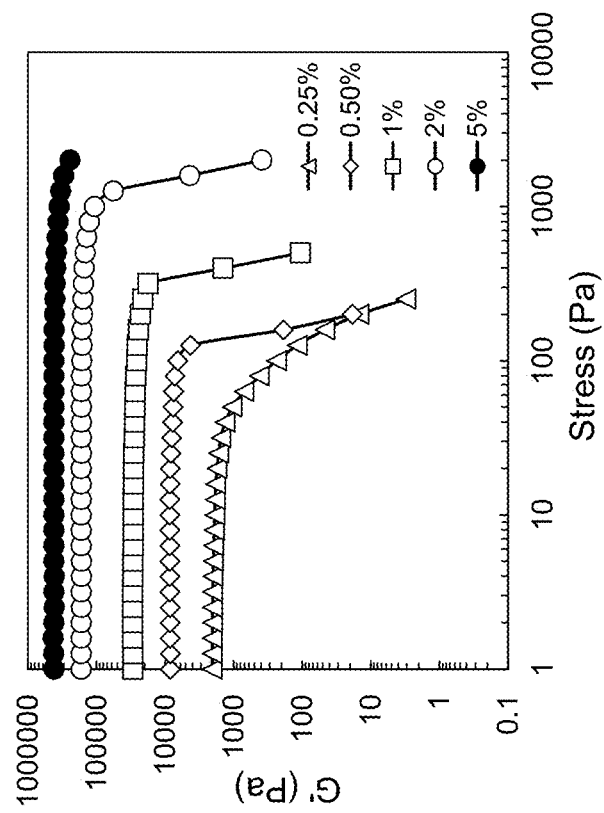
FIG. 2A is a line graph showing stress amplitude sweeps at 10 Hz on gels with different DBS concentrations.
Figure 23:
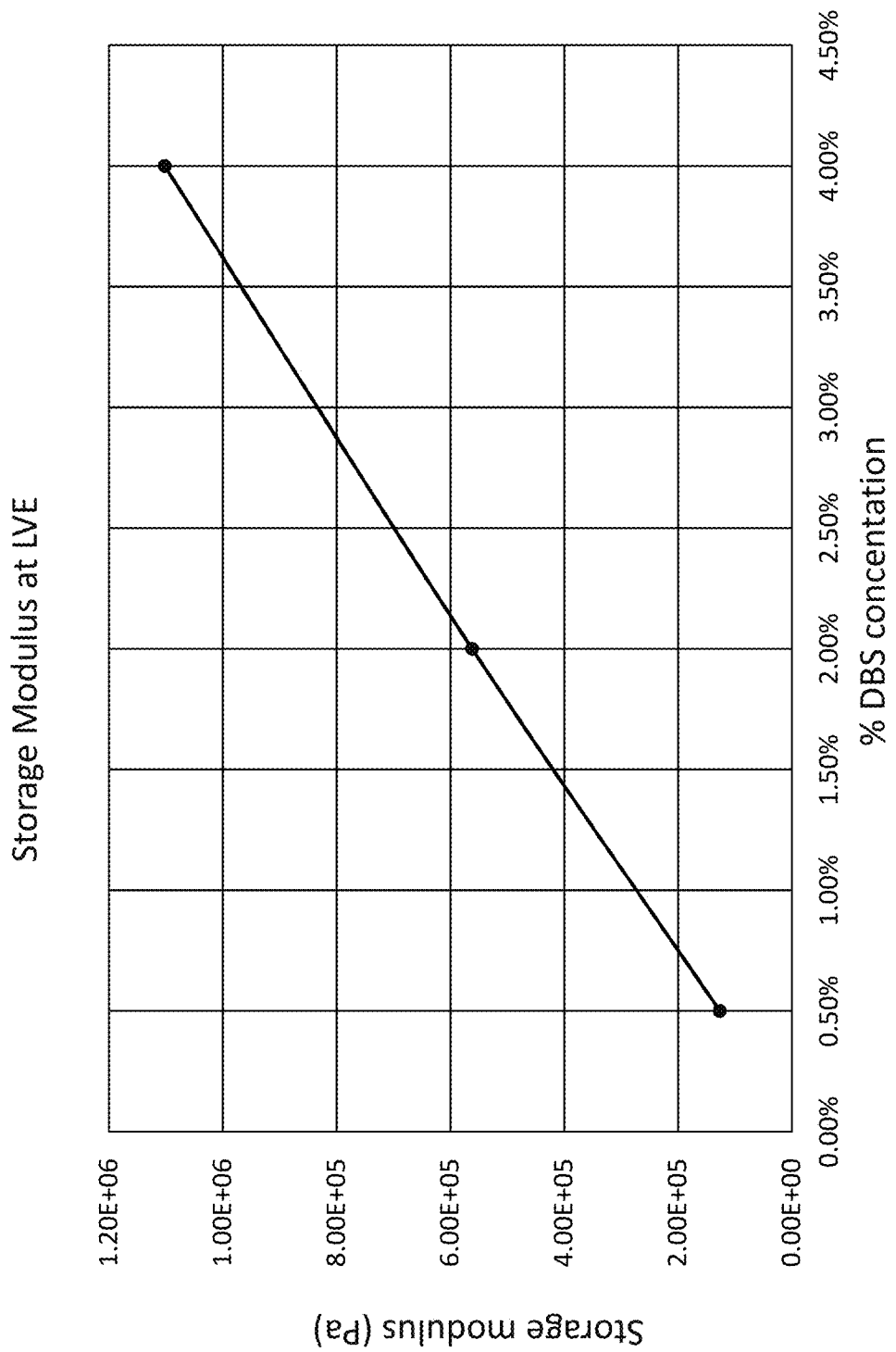
FIG. 23 is a line graph showing the storage modulus of DBS gels as a function of the concentration of DBS in the gel.
Figure 24:
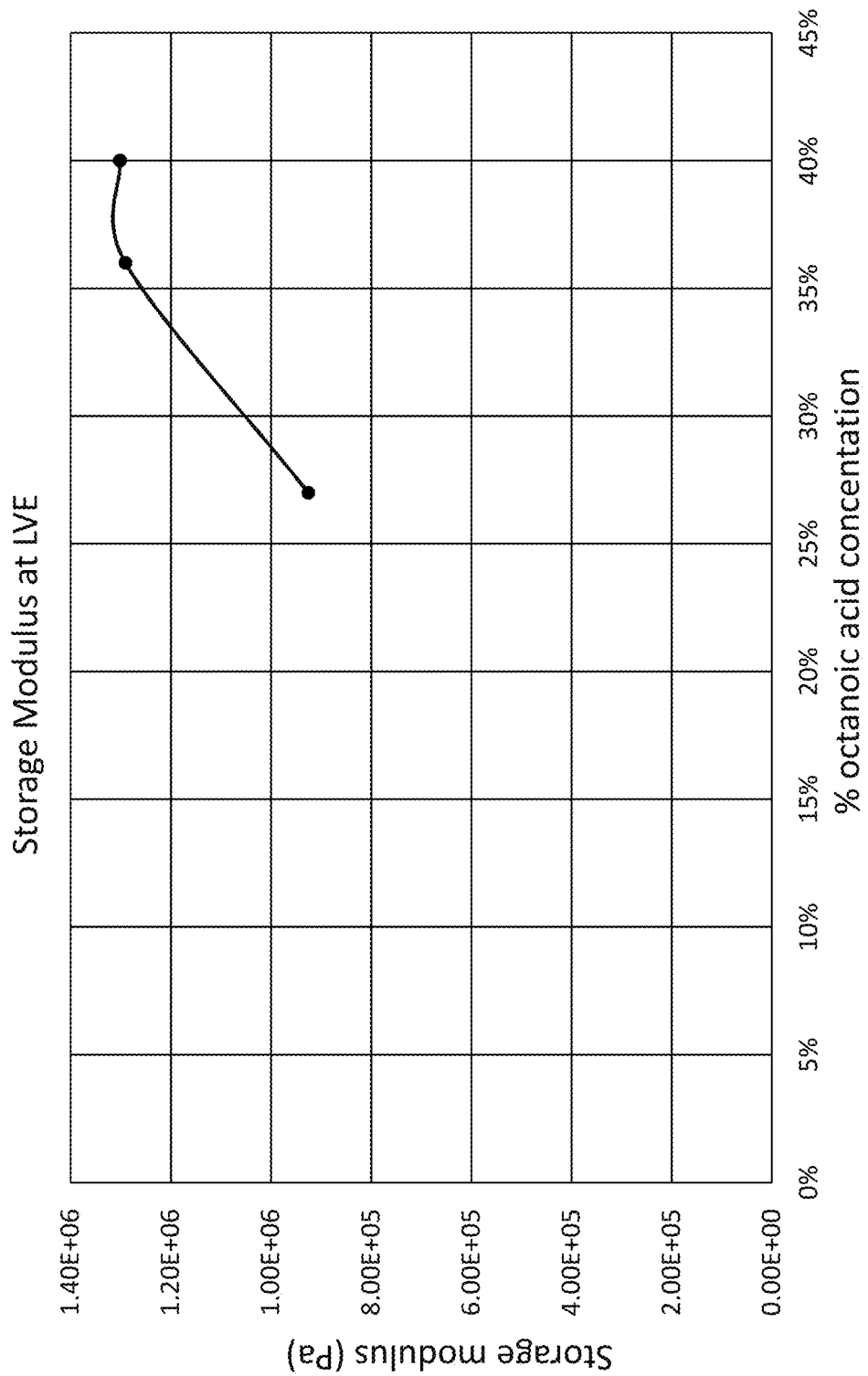
FIG. 24 is a line graph showing the storage modulus of DBS gels as a function of the concentration of octanoic acid in the gel.

Effect of DBS Concentration:

The viscoelastic properties of the DBS gels were studied. The elastic (G') and viscous (G") moduli were measured as a function of gallant concentration. Fully developed gels were obtained at a DBS concentration as low as 0.25 wt. %. The gels are identified using oscillatory shear rheology. In gels, G' is typically higher than G", and G' is typically independent over a frequency range. These gel characteristics were exhibited by all samples containing 0.25 wt. % or higher DBS concentrations. Increasing the DBS concentration increases the strength of the gel as exhibited by the increase in the value of G' (FIG. 2A). FIG. 2B shows the dependence of G' with the gelator concentration followed by a power law dependence with the exponent, n=2. An increase in gel strength with increasing DBS concentration was also observed by examining the storage modulus in the linear viscoelastic (LVE) region, as shown in FIG. 23. The strength of the gel can also be altered by adjusting the concentration of organic acid present, as shown in FIG. 24. Since these gels are assembled by weak intermolecular interaction, the gels exhibit thixotropic behavior. Upon applying high-stress amplitude (higher than yield stress), the gel behaves like a liquid. FIG. 2A shows at low applied stresses, G' is constant. Once the yield stress value is exceeded, a rapid drop in G' is observed. FIG. 2B shows that increasing gallant concentration increases the yield stress. There is also a power law dependence between the yield stress and the gellant concentration with the exponent, n=1.3.

FIG. 2 shows the dependence of viscoelastic properties of the gels on DBS concentration. A) shows stress amplitude sweeps at 10 Hz on gels with different DBS concentration. B) shows dependence of elastic moduli (G') and yield stress (ay) on the DBS concentration in the gel.

Figure 14:
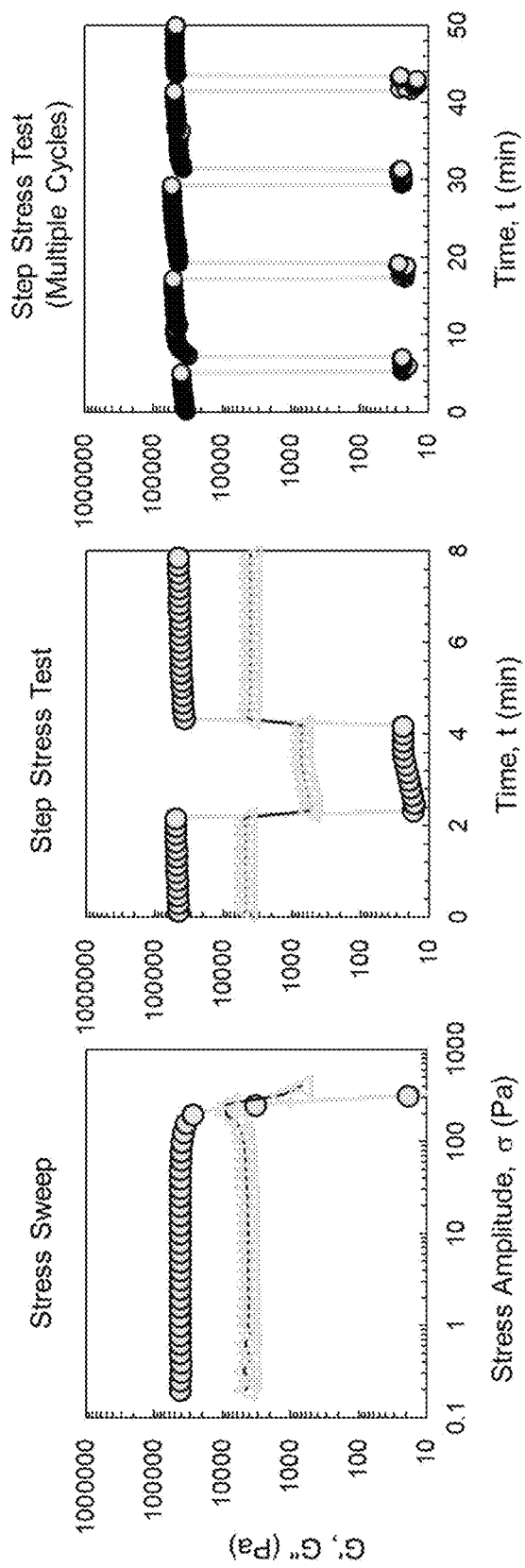
FIG. 14 is a series of scatter plots showing, for a 1 wt. % DBS gel in hexanol, a stress sweep test (left), a step stress test (center), and multiple cycles of a step stress test (right), all measured at a constant frequency of 10 Hz.

DBS gels also exhibit shear-thinning and thixotropy. That is, the nanofibrillar network of DBS is held by weak bonds, and these can be disrupted by shear. This causes the sample to liquefy under shear and the viscosity decreases with increasing shear rate. When the shear is stopped, the network is restored quickly and the gel regains its elastic (solid) character. These aspects are shown by FIG. 14, which is data for a 1% DBS gel in hexanol.

FIG. 14(A) (left) is a plot of the elastic modulus G' and the viscous modulus G" as a function of the stress amplitude. At low stresses, G'~40,000 Pa is constant, indicating that the DBS network is intact. But when the yield stress $\sigma_y$ (~200 Pa) is exceeded, G' decreases rapidly, indicating that the network is disrupted, i.e., the sample is converted to a liquid.

FIG. 14(B) (center) shows the results from a step-stress test on the above sample. At a low stress (10 Pa), the gel is intact (G'>G"). In the second step, a stress of 300 Pa (>$\sigma_y$) is applied and this disrupts the network, and the rheology becomes liquid-like (G">G'). In the final step, the stress is reduced back to 10 Pa, and the gel state is quickly regained (in <20 s). The quick recovery of the DBS network is also seen in repeated cycles of the step-stress test (FIG. 14(C) (right)). Even after 10 such cycles, the gel modulus G' was virtually unchanged.

Figure 13:
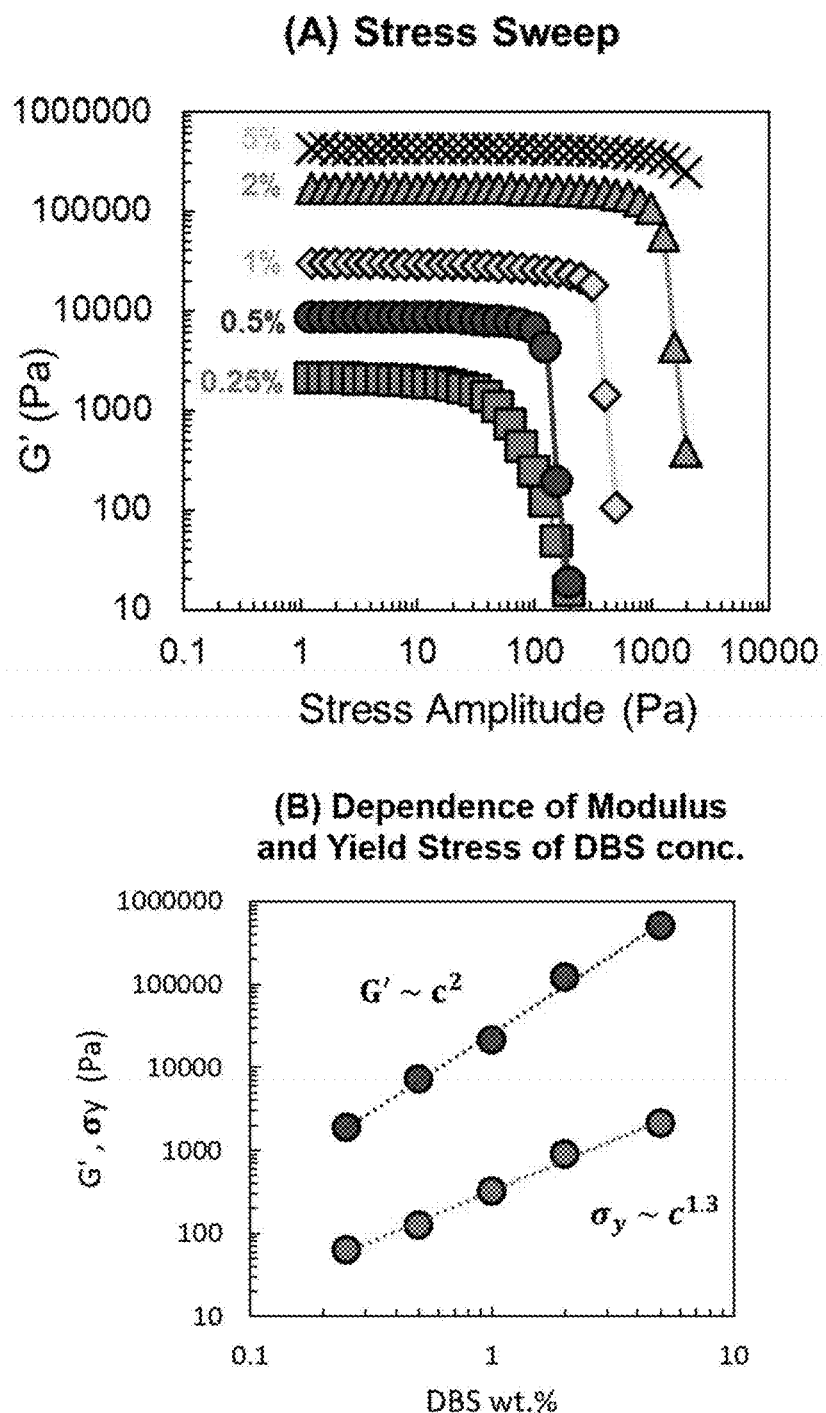
FIG. 13 is a scatter plot showing G' as a function of stress amplitude for gels having a DBS concentration of 0.25 wt. %, 0.5 wt. %, 1 wt. %, 2 wt. %, or 5 wt. % (A) and a scatter plot showing G' and $a_y$ as a function of DBS wt. % (B).

The rheology of DBS gels as a function of the DBS concentration was also studied. With an increase in DBS, the gel modulus G' and the yield stress $\sigma_y$ of the gel both increase steadily, as shown in FIG. 13. Log-log plots of G' and $\sigma_y$ versus DBS concentration c show that both quantities follow polymer laws (FIG. 13 (bottom)), with G' ~$c^2$ and $\sigma_y$~$c^{1.3}$.

Figure 20:
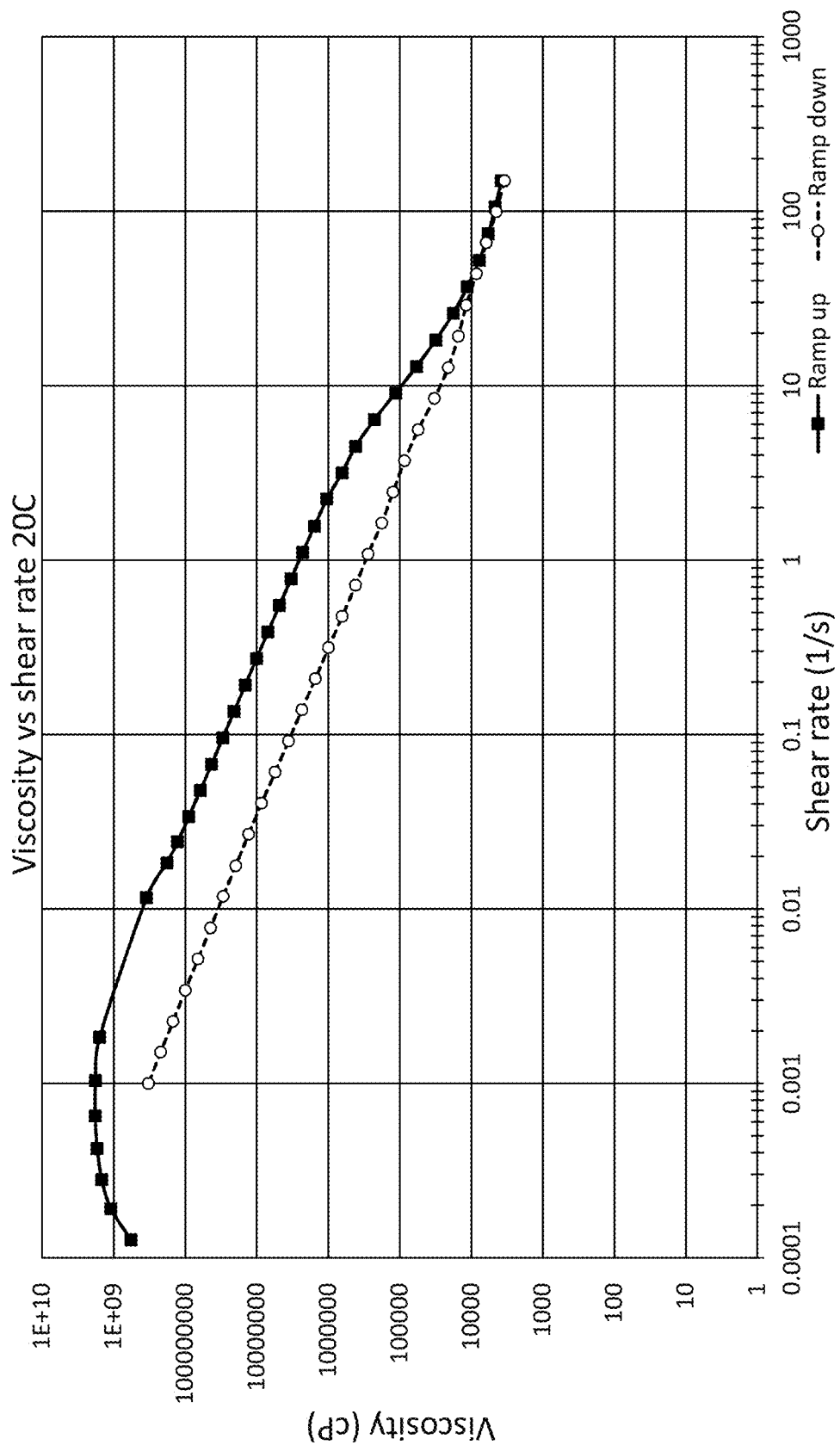
FIG. 20 is a line graph showing the viscosity of DBS gels as a function of shear rate at 20° C.
Figure 21:
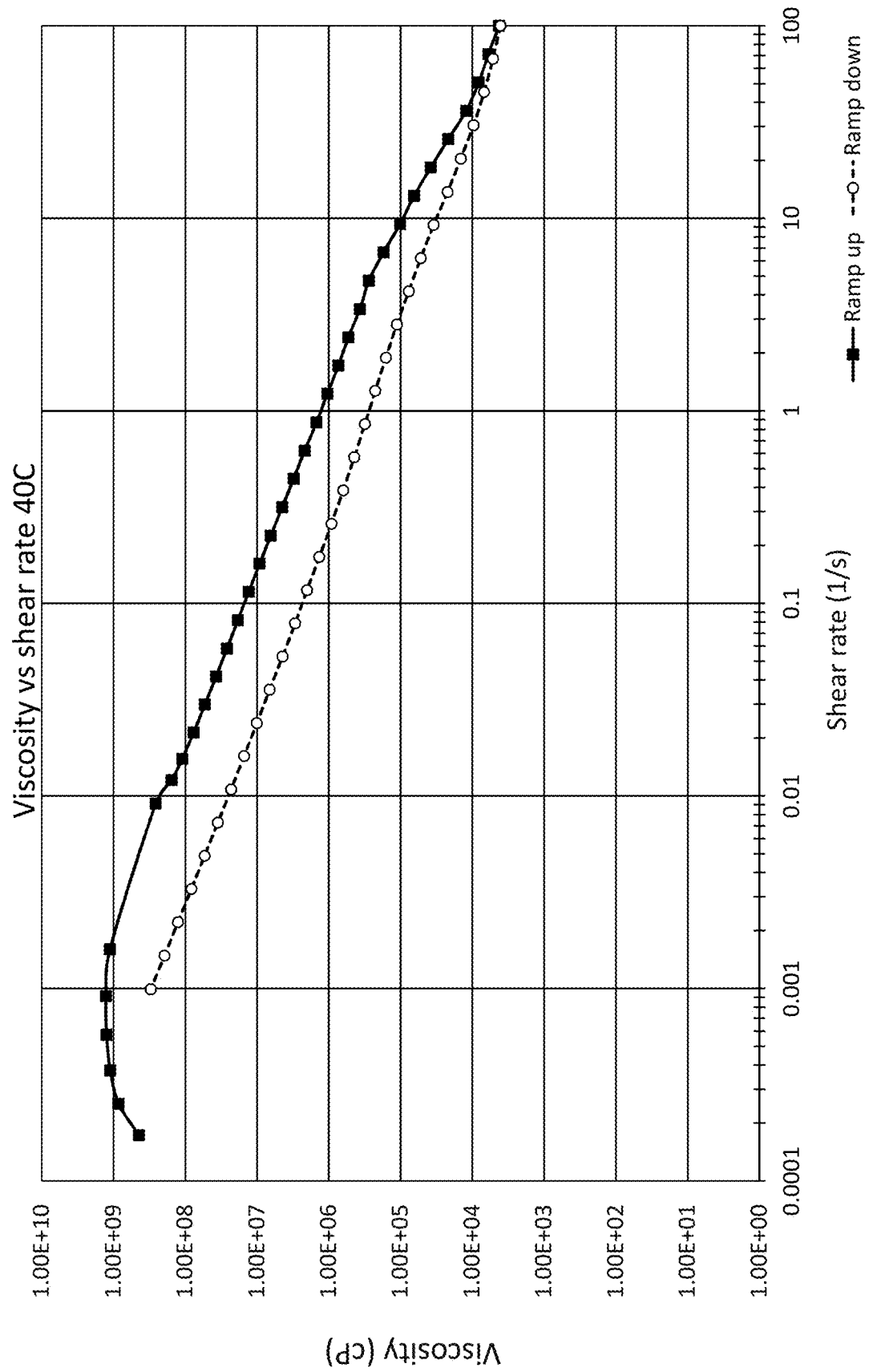
FIG. 21 is a line graph showing the viscosity of DBS gels as a function of shear rate at 40° C.
Figure 22:
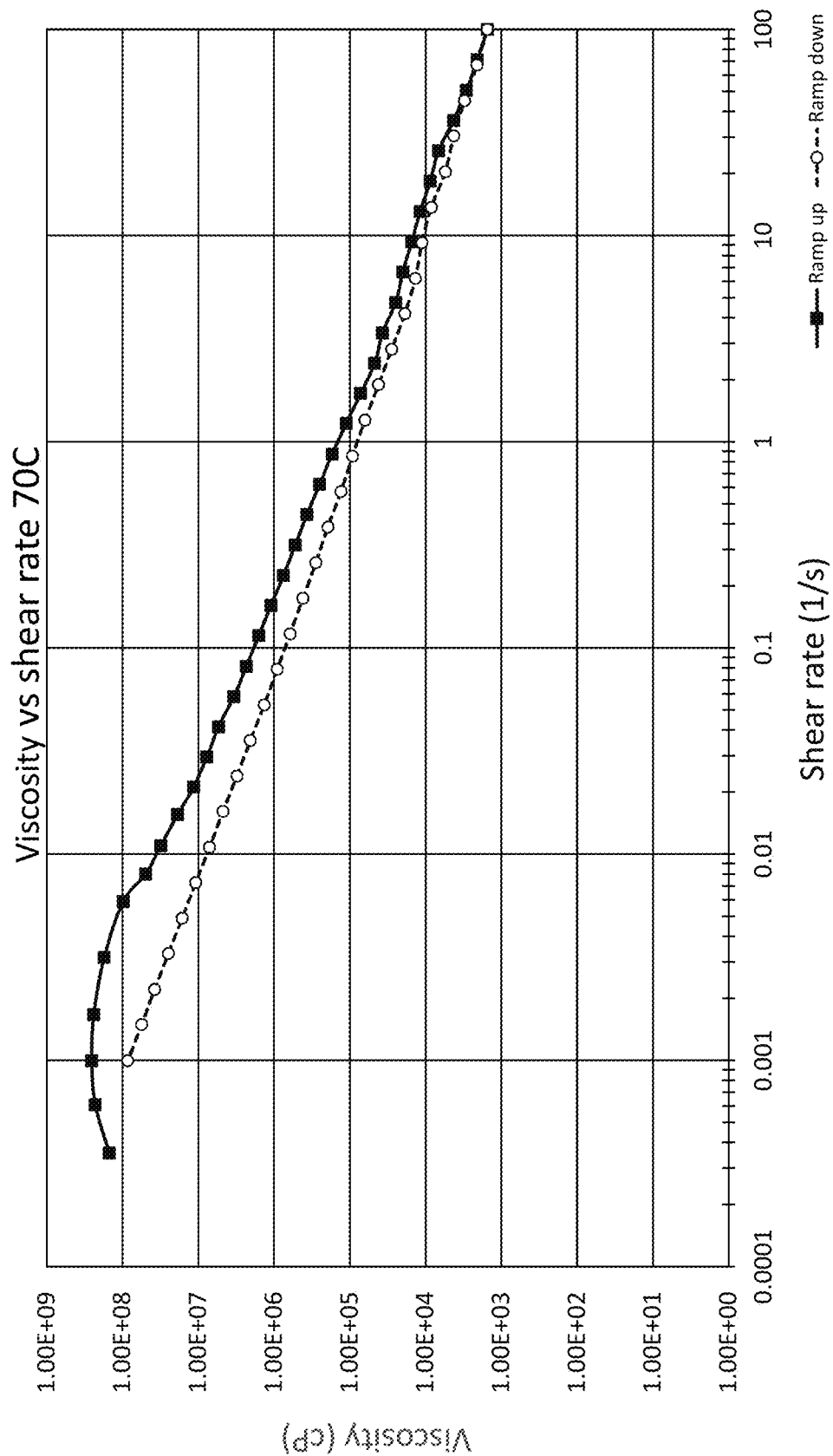
FIG. 22 is a line graph showing the viscosity of DBS gels as a function of shear rate at 70° C.

The gels also maintain their strength over a wide range of temperatures, e.g., from about 10° C. to about 90° C. or from about 20° C. to about 70° C. As shown in FIGS. 20-22, at 20° C., 40° C., and 70° C., DBS gels decrease in viscosity upon increasing shear rate but quickly recover upon reversing the shear rate, demonstrating their strength over a wide range of temperatures.

Figure 26:
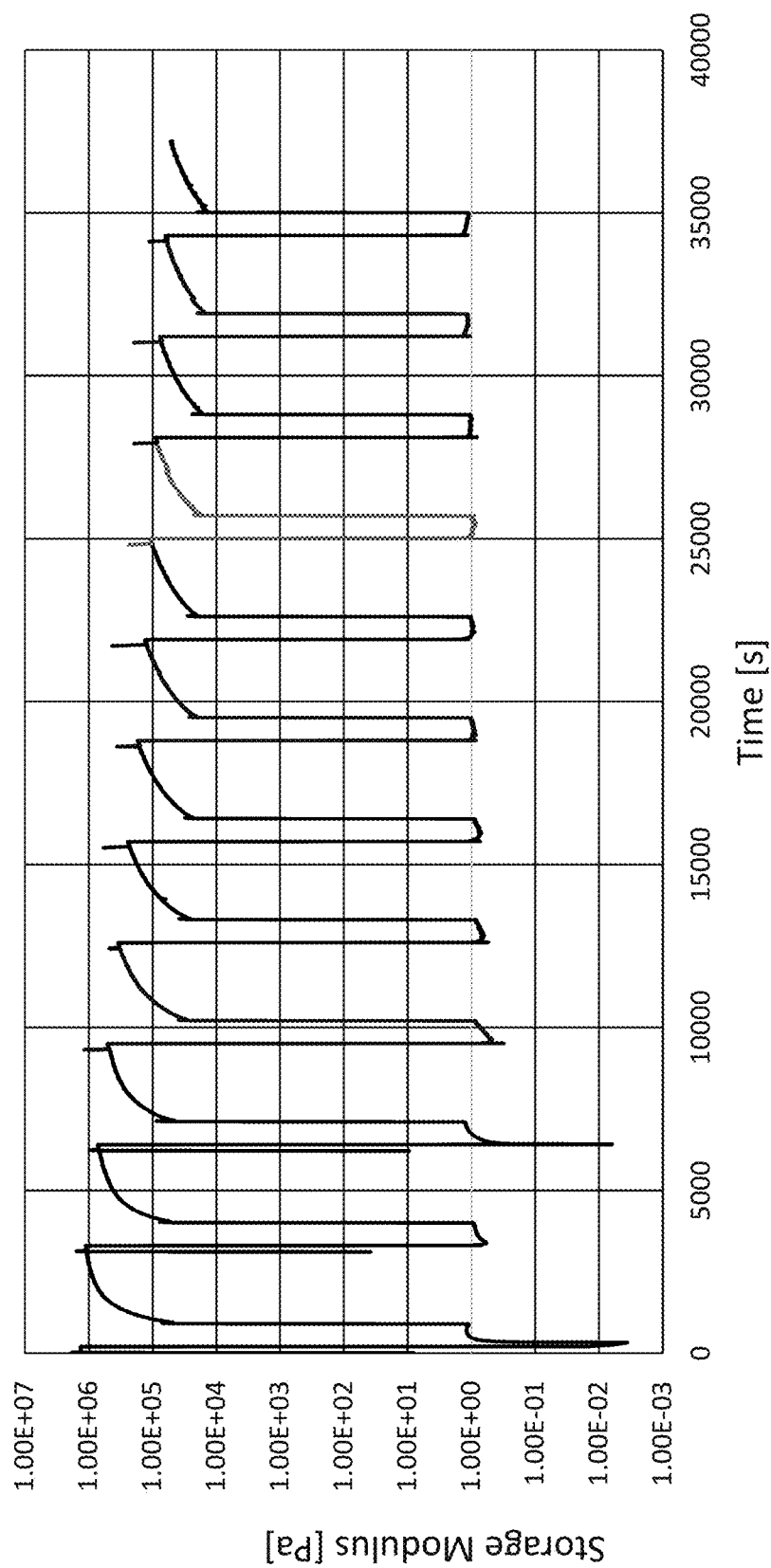
FIG. 26 is a line graph showing the decrease in storage modulus of DBS gels when broken and their subsequent recovery over time, repeated over a number of cycles.
Figure 27:
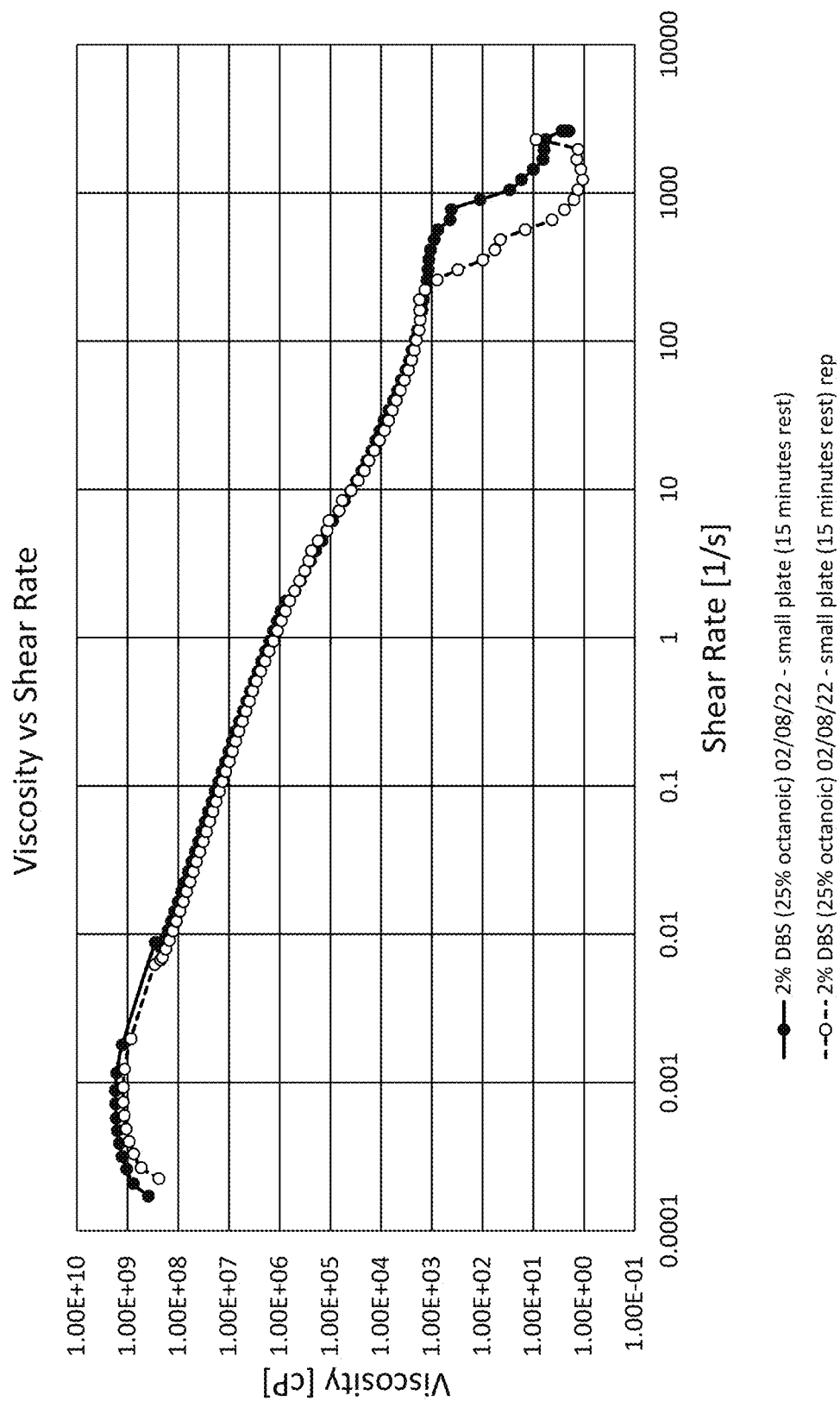
FIG. 27 is a line graph showing the viscosity of DBS gels as a function of shear rate.

The gels may also exhibit self-healing. As used herein, the term "self-healing" refers to the ability of a gel that has lost its initial strength (e.g., as measured by viscosity) is capable of spontaneously regaining its initial strength (or a significant percentage thereof). DBS gels demonstrate self-healing, as shown in FIG. 26, wherein DBS gels are broken and allowed to reform numerous times.

Figure 28:
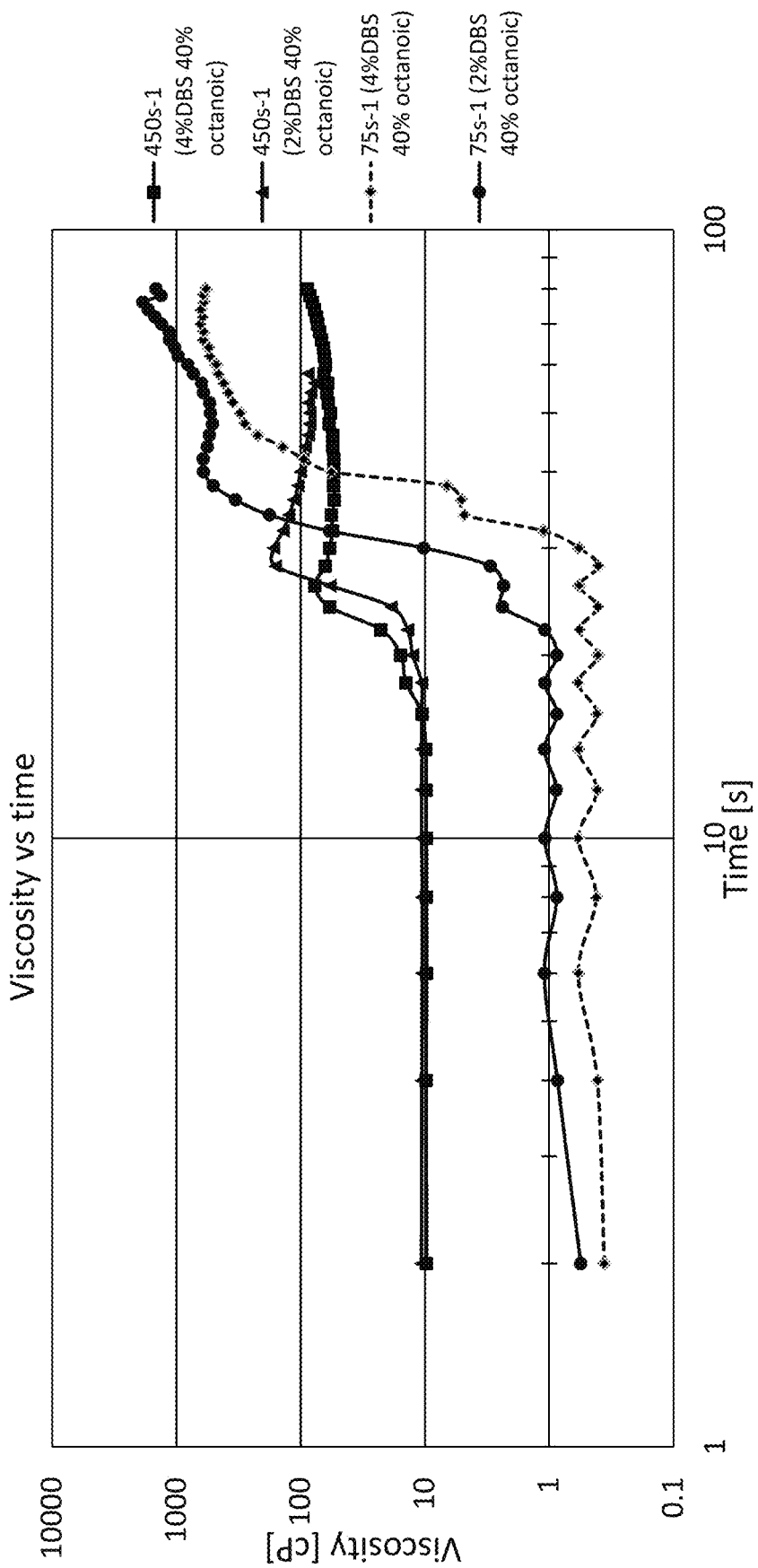
FIG. 28 is a line graph showing the viscosity as a function of time of DBS gels formed at different shear rates.

It was also found that shear rate during gel formation affects gel viscosity. As shown in FIG. 28, gels formed at a lower shear rate become much more viscous than those formed at a higher rate.

Figure 3B:
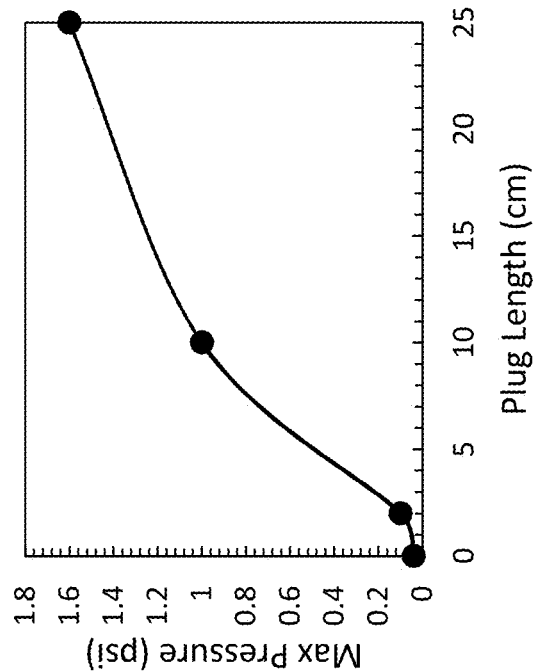
FIG. 3B is a line graph showing the maximum pressure that the plug could withstand as a function of the plug length. The gel has a DBS concentration of 0.5 wt % and the tube has an inner diameter of 3 mm.
Figure 3A:
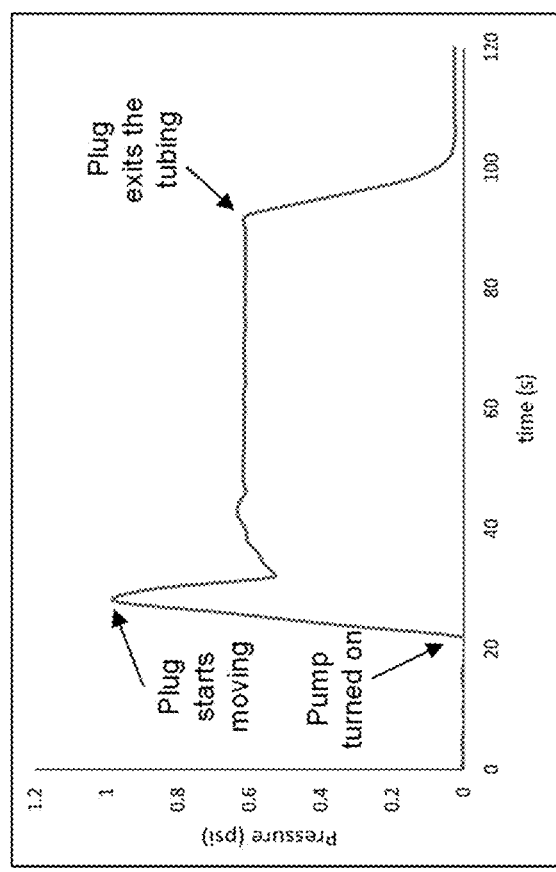
FIG. 3A is a line graph showing the pressure profile of the flow-blocking experiment described herein. The gel has a DBS concentration of 0.5 wt % and the tube has an inner diameter of 3 mm.

Plugging Ability of the Gel:

To develop a better understanding of the plugging ability of the gels, plugging experiments were conducted. A smooth plastic tubing was plugged with a 0.5 wt. % DBS gel. Then, water was pumped and the pressure required to fail the plug and resume the flow was measured. A characteristic pressure profile is depicted in FIG. 3A. The failure of the plug happens between the interface of the gel and the smooth plastic tubing. The gel plug does not deform and moves along the length of the pipe due to water pressure. The length of the plug was varied, and it was observed that increasing plug length increases the failure pressure (FIG. 3B).

FIG. 3 shows plugging a smooth plastic tubing with the DBS gel. A) shows a characteristic pressure profile of the flow-blocking experiment. B) shows the plot of maximum pressure the plug could withstand as a function of the plug length. The gel has the DBS concentration of 0.5 wt. % and tube has the internal diameter of 3 mm.

Figure 4B:
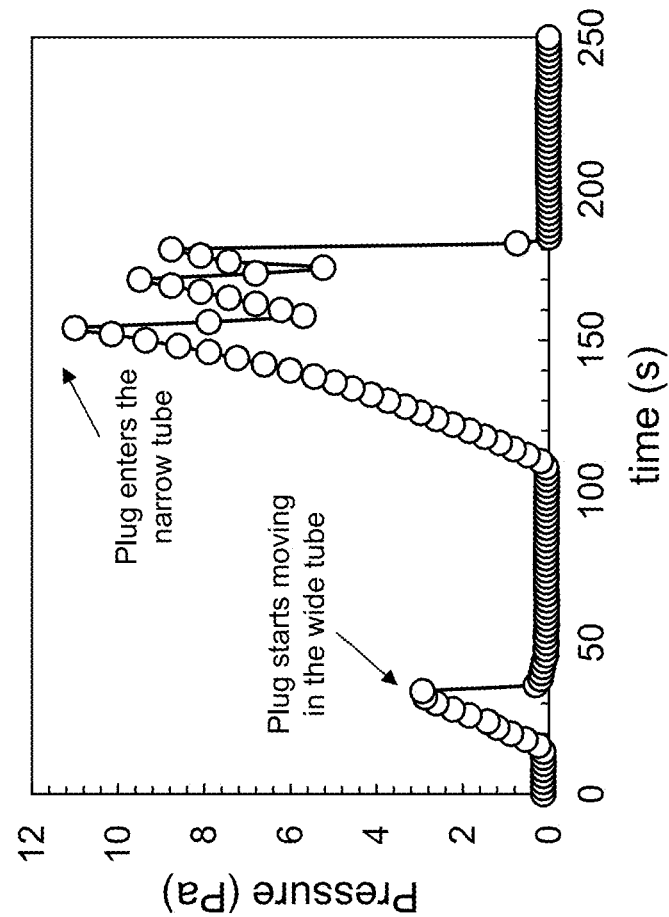
FIG. 4B is a line graph showing a characteristic pressure profile of the flow-blocking experiment described herein with a step change in the tube diameter. The wide and narrow tubes have an inner diameter of 6.35 mm and 1.38 mm, respectively.
Figure 4A:
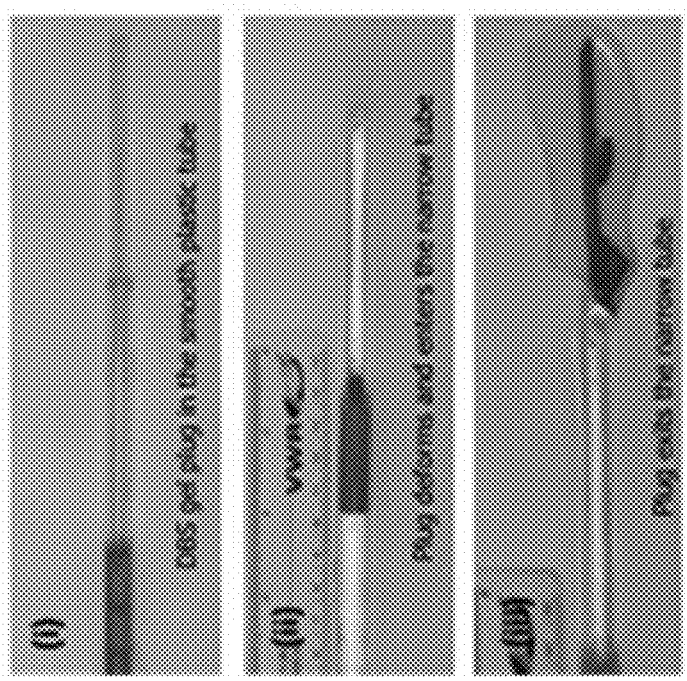
FIG. 4A is a series of photographs demonstrating that when pressure is applied, the failure occurs at the interface and the plug moves along the wide tube (photo (i)); when there is a step change in the tube diameter, the plug stops moving, and when the pressure is high enough, the plug enters the narrow tube (photo (ii)); eventually, the plug exits the flow-loop (photo (iii)). The wide and narrow tubes have an inner diameter of 6.35 mm and 1.38 mm, respectively.

To mimic the fractures in rock formation, which do not have constant diameter, plastic pipes with two different diameters were connected together (FIG. 4A). The plug was placed in the tube with a larger diameter and water was pumped. As before, the failure occurred at the interface. Once the plug reached the mouth of the narrower tube, it stopped and the pressure kept building up. Eventually, the gel deformed and entered the narrower tube. The gel then assumed a cylindrical shape with the diameter equal to the interior diameter of the narrow tube. The gel then moved along and exited the tubing as a cylindrical plug. The characteristic pressure profile of this flow experiment is shown in FIG. 4B. The pressure required to deform the gel is much higher than the pressure causing interfacial failure between the gel and the smooth tube.

FIG. 4 shows a flow-blocking experiment with a step-change in the tube diameter. A) (i) When pressure is applied, the failure occurs at the interface and the plug moves along the wide tube. (ii) When there is a step change in the tube diameter, the plug stops moving. When the pressure is high enough, the plug enters the narrow tube. (iii) Eventually, the plug exits the flow-loop. B) shows a characteristic pressure profile of the flow-blocking experiment with a step change in the tube diameter. The wide and narrow tubes have the inner diameter of 6.35 mm and 1.38 mm, respectively.

In some embodiments, the gel is capable of plugging a fracture or pore space within a rock formation. In some embodiments, the plugging is reversible. In some embodiments, the plugging is reversed by degradation of the gel after a time period. The length of the time period before the plugging is reversed by degradation may be controlled by altering various aspects of the gel, including, but not limited to, the gelator, degrading agent, or the concentration of the gelator and/or the degrading agent. Degradation of the gel may occur by various methods described herein.

In some embodiments, the gel plugs the fracture or pore space for from about 1 day to about 4 weeks. In some embodiments, the gel plugs the fracture or pore space for from about 2 weeks to about 6 weeks. In some embodiments, the gel plugs the fracture or pore space for from about 1 day to about 2 days, from about 1 day to about 3 days, from about 1 day to about 4 days, from about 1 day to about 5 days, from about 1 day to about 6 days, from about 1 day to about 1 week, from about 1 day to about 2 weeks, from about 1 day to about 3 weeks, from about 2 days to about 3 days, from about 2 days to about 3 days, from about 2 days to about 4 days, from about 2 days to about 5 days, from about 2 days to about 6 days, from about 2 days to about 1 week, from about 2 days to about 2 weeks, from about 2 days to about 3 weeks, from about 2 days to about 4 weeks, from about 3 days to about 4 days, from about 3 days to about 5 days, from about 3 days to about 6 days, from about 3 days to about 1 week, from about 3 days to about 2 weeks, from about 3 days to about 3 weeks, from about 3 days to about 4 weeks, from about 4 days to about 5 days, from about 4 days to about 6 days, from about 4 days to about 1 week, from about 4 days to about 2 weeks, from about 4 days to about 3 weeks, from about 4 days to about 4 weeks, from about 5 days to about 6 days, from about 5 days to about 1 week, from about 5 days to about 2 weeks, from about 5 days to about 3 weeks, from about 5 days to about 4 weeks, from about 6 days to about 1 week, from about 6 days to about 2 weeks, from about 6 days to about 3 weeks, from about 6 days to about 4 weeks, from about 1 week to about 2 weeks, from about 1 week to about 3 weeks, from about 1 week to about 4 weeks, from about 2 week to about 3 weeks, from about 2 week to about 4 weeks, or from about 3 weeks to about 4 weeks. In some embodiments, the gel plugs the fracture or pore space for from about 2 weeks to about 5 weeks, from about 2 weeks to about 6 weeks, from about 2 weeks to about 7 weeks, from about 2 weeks to about 8 weeks, from about 2 weeks to about 9 weeks, from about 2 weeks to about 10 weeks, from about 2 weeks to about 11 weeks, from about 2 weeks to about 12 weeks, from about 2 weeks to about 13 weeks, from about 2 weeks to about 14 weeks, from about 2 weeks to about 15 weeks, from about 2 weeks to about 16 weeks, from about 3 weeks to about 5 weeks, from about 3 weeks to about 6 weeks, from about 3 weeks to about 7 weeks, from about 3 weeks to about 8 weeks, from about 3 weeks to about 9 weeks, from about 3 weeks to about 10 weeks, from about 3 weeks to about 11 weeks, from about 3 weeks to about 12 weeks, from about 3 weeks to about 13 weeks, from about 3 weeks to about 14 weeks, from about 3 weeks to about 15 weeks, from about 3 weeks to about 16 weeks, from about 4 weeks to about 5 weeks, from about 4 weeks to about 6 weeks, from about 4 weeks to about 7 weeks, from about 4 weeks to about 8 weeks, from about 4 weeks to about 9 weeks, from about 4 weeks to about 10 weeks, from about 4 weeks to about 11 weeks, from about 4 weeks to about 12 weeks, from about 4 weeks to about 13 weeks, from about 4 weeks to about 14 weeks, from about 4 weeks to about 15 weeks, from about 4 weeks to about 16 weeks, from about 5 weeks to about 6 weeks, from about 5 weeks to about 7 weeks, from about 5 weeks to about 8 weeks, from about 5 weeks to about 9 weeks, from about 5 weeks to about 10 weeks, from about 5 weeks to about 11 weeks, from about 5 weeks to about 12 weeks, from about 5 weeks to about 13 weeks, from about 5 weeks to about 14 weeks, from about 5 weeks to about 15 weeks, from about 5 weeks to about 16 weeks, from about 6 weeks to about 7 weeks, from about 6 weeks to about 8 weeks, from about 6 weeks to about 9 weeks, from about 6 weeks to about 10 weeks, from about 6 weeks to about 11 weeks, from about 6 weeks to about 12 weeks, from about 6 weeks to about 13 weeks, from about 6 weeks to about 14 weeks, from about 6 weeks to about 15 weeks, from about 6 weeks to about 16 weeks, from about 7 weeks to about 8 weeks, from about 7 weeks to about 9 weeks, from about 7 weeks to about 10 weeks, from about 7 weeks to about 11 weeks, from about 7 weeks to about 12 weeks, from about 7 weeks to about 13 weeks, from about 7 weeks to about 14 weeks, from about 7 weeks to about 15 weeks, from about 7 weeks to about 16 weeks, from about 8 weeks to about 9 weeks, from about 8 weeks to about 10 weeks, from about 8 weeks to about 11 weeks, from about 8 weeks to about 12 weeks, from about 8 weeks to about 13 weeks, from about 8 weeks to about 14 weeks, from about 8 weeks to about 15 weeks, from about 8 weeks to about 16 weeks, from about 9 weeks to about 10 weeks, from about 9 weeks to about 11 weeks, from about 9 weeks to about 12 weeks, from about 9 weeks to about 13 weeks, from about 9 weeks to about 14 weeks, from about 9 weeks to about 15 weeks, from about 9 weeks to about 16 weeks, from about 10 weeks to about 11 weeks, from about 10 weeks to about 12 weeks, from about 10 weeks to about 13 weeks, from about 10 weeks to about 14 weeks, from about 10 weeks to about 15 weeks, from about 10 weeks to about 16 weeks, from about 11 weeks to about 12 weeks, from about 11 weeks to about 13 weeks, from about 11 weeks to about 14 weeks, from about 11 weeks to about 15 weeks, from about 11 weeks to about 16 weeks, from about 12 weeks to about 13 weeks, from about 12 weeks to about 14 weeks, from about 12 weeks to about 15 weeks, from about 12 weeks to about 16 weeks, from about 13 weeks to about 14 weeks, from about 13 weeks to about 15 weeks, from about 13 weeks to about 16 weeks, from about 14 weeks to about 15 weeks, from about 14 weeks to about 16 weeks, or from about 15 weeks to about 16 weeks.

In some embodiments, the gel plugs the fracture or pore space for about 1 day. In some embodiments, the gel plugs the fracture for about 2 days, about 3 days, about 4 days, about 5 days, about 9 days, about 1 week, about 2 weeks, about 3 weeks, or about 4 weeks. In some embodiments, the gel plugs the fracture or pore space for about 5 weeks, about 6 weeks, about 7 weeks, about 8 weeks, about 9 weeks, about 10 weeks, about 11 weeks, about 12 weeks, about 13 weeks, about 14 weeks, about 15 weeks, or about 16 weeks.

Figure 5:
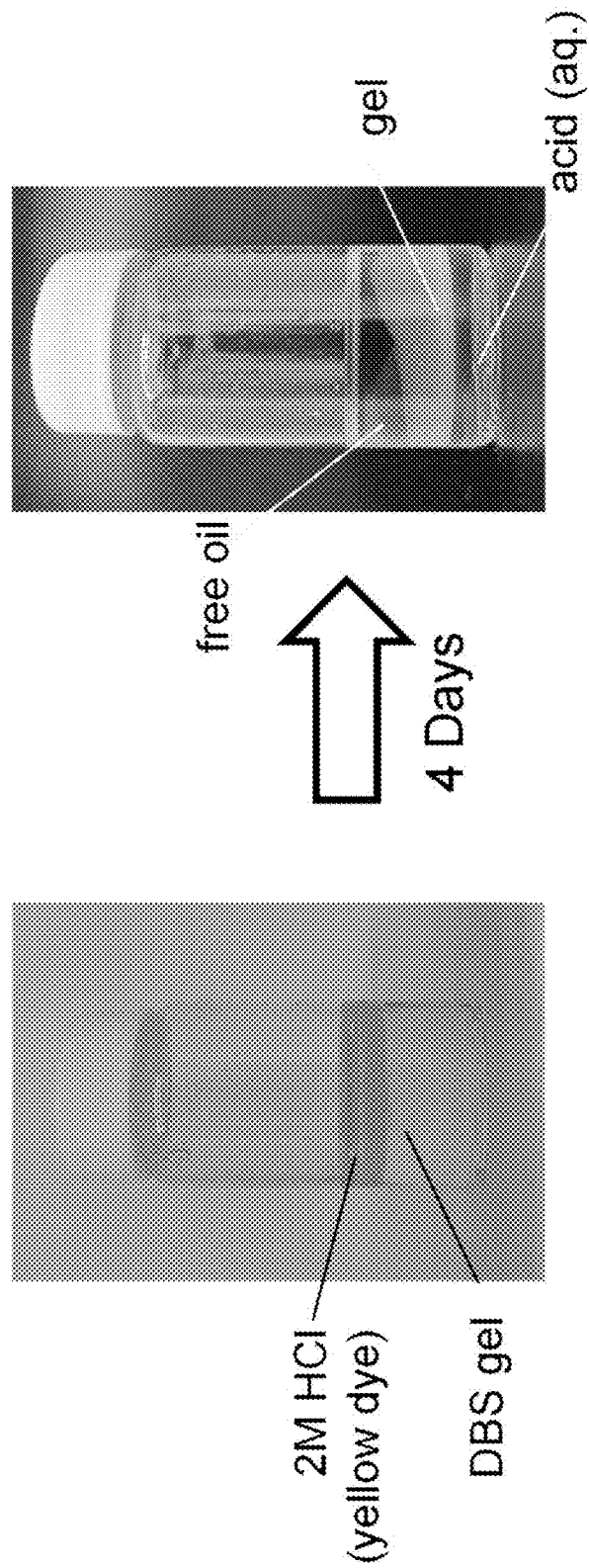
FIG. 5 is a schematic showing degradation of a DBS gel over four days when contacted with aqueous hydrochloric acid. After four days, the free oil and the remaining gel are visible.

Self-Degrading Gel:

DBS gels are formed via weak intermolecular forces, so the gels can be degraded by solvents that can dissolve DBS. DBS gels degrade when contacted with DMSO, which is a good solvent for DBS. DBS partitions from the gel into DMSO and eventually the gel is physically degraded. In other embodiments, the gel is chemically degraded. It was also found that the DBS gels are degraded in presence of an acid. FIG. 5 shows when aqueous hydrochloric acid (HCl) is contacted with a DBS gel, the gel starts to degrade and is completely degraded over a period of several days. DBS contains two acetal groups, which react with acid to produce an aldehyde. Therefore, without wishing to be bound by theory, it is hypothesized that in presence of an acid, DBS is chemically hydrolyzed into benzaldehyde and sorbitol according to the following reaction scheme:

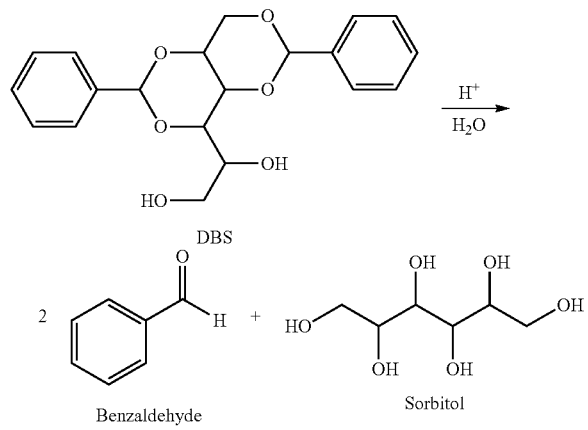

The degraded products, benzaldehyde, and sorbitol, exhibit no self-assembly, so upon hydrolysis of DBS, the gel is converted into a thin solution. Tollens' Test was performed on the sample before and after acid degradation. The results showed that upon degradation, an aldehyde is produced, supporting the hypothesis described above.

FIG. 5 shows degradation of DBS gels in presence of an aqueous acid. When DBS gels are contacted with aqueous HCl, the gels start to degrade and eventually completely degrades over a course of several days. After 4 days, the free oil and the remaining gel is visible.

Since degradation by acid is a relatively slow process, it is possible to synthesize a gel with an acid already present in it. The resulting gel is stable for a few days due to slow degradation but eventually degrades into a thin solution. To produce a self-degrading gel, a water-in-oil emulsion was formed. A mineral oil-hexanol mixture was used for the oil phase and a desired concentration of hydrochloric acid (HCl) was used for the aqueous phase. Then, the gelling solution was quickly added, which formed an emulsion gel. The process is shown schematically in FIG. 6. These emulsion gels exhibited a self-degrading behavior with the degradation time depending on the concentration of the acid.

Figure 6:
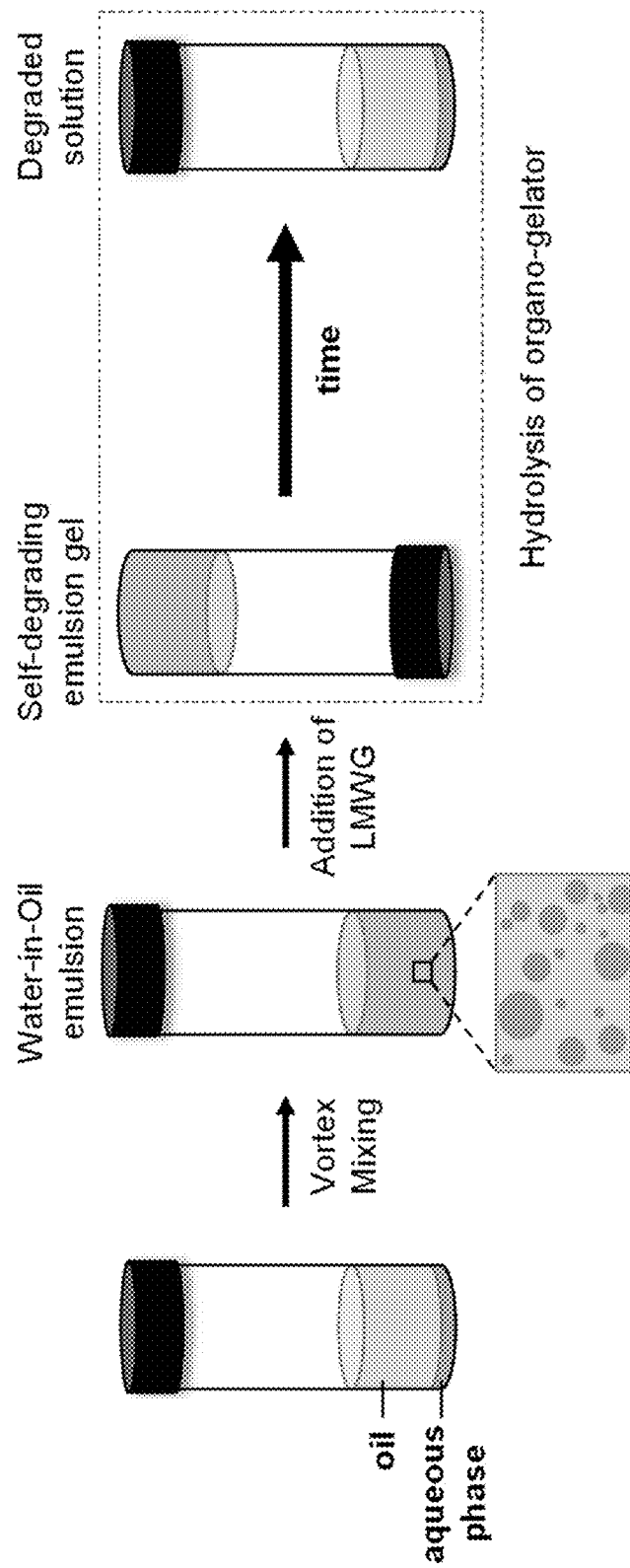
FIG. 6 is a schematic showing the synthesis of a self-degrading emulsion gel, wherein the aqueous phase is dispersed in the oil phase, which is then gelled using DBS; due to the presence of acid in the aqueous phase, the DBS is slowly hydrolyzed and the gel is eventually degraded.

FIG. 6 schematically shows the synthesis of self-degrading emulsion gel. The aqueous is dispersed in the oil phase, which is then gelled using DBS. Due to the presence of the acid, the DBS is slowly hydrolyzed and the gel is eventually degraded.

It was observed that the degradation time for the self-degrading emulsion gel decreases with increasing the concentration of the acid. It was also found that the weaker acids, such as formic acid, took longer to degrade when compared to an emulsion gel with the same concentration of HCl. In examples, the concentration of hydronium ions dictates the degradation time. Since a weaker acid dissociates incompletely, a higher concentration of the acid is required to achieve a similar degradation time as the gel with the strong acid. Hence, the degradation time for these self-degrading emulsion gels can be controlled via the type and the concentration of the acid used. In some embodiments, one or more acids, for example, one or more, two or more, three or more, or four or more acids, are used to degrade the gel.

In some embodiments, the gel degrades over a period of from about 1 day to about 4 weeks. In some embodiments, the gel degrades over a period of from about 2 weeks to about 6 weeks. In some embodiments, the gel degrades over a period of from about 1 day to about 2 days, from about 1 day to about 3 days, from about 1 day to about 4 days, from about 1 day to about 5 days, from about 1 day to about 6 days, from about 1 day to about 1 week, from about 1 day to about 2 weeks, from about 1 day to about 3 weeks, from about 2 days to about 3 days, from about 2 days to about 3 days, from about 2 days to about 4 days, from about 2 days to about 5 days, from about 2 days to about 6 days, from about 2 days to about 1 week, from about 2 days to about 2 weeks, from about 2 days to about 3 weeks, from about 2 days to about 4 weeks, from about 3 days to about 4 days, from about 3 days to about 5 days, from about 3 days to about 6 days, from about 3 days to about 1 week, from about 3 days to about 2 weeks, from about 3 days to about 3 weeks, from about 3 days to about 4 weeks, from about 4 days to about 5 days, from about 4 days to about 6 days, from about 4 days to about 1 week, from about 4 days to about 2 weeks, from about 4 days to about 3 weeks, from about 4 days to about 4 weeks, from about 5 days to about 6 days, from about 5 days to about 1 week, from about 5 days to about 2 weeks, from about 5 days to about 3 weeks, from about 5 days to about 4 weeks, from about 6 days to about 1 week, from about 6 days to about 2 weeks, from about 6 days to about 3 weeks, from about 6 days to about 4 weeks, from about 1 week to about 2 weeks, from about 1 week to about 3 weeks, from about 1 week to about 4 weeks, from about 2 week to about 3 weeks, from about 2 week to about 4 weeks, or from about 3 weeks to about 4 weeks. In some embodiments, the gel degrades over a period of from about 2 weeks to about 5 weeks, from about 2 weeks to about 6 weeks, from about 2 weeks to about 7 weeks, from about 2 weeks to about 8 weeks, from about 2 weeks to about 9 weeks, from about 2 weeks to about 10 weeks, from about 2 weeks to about 11 weeks, from about 2 weeks to about 12 weeks, from about 2 weeks to about 13 weeks, from about 2 weeks to about 14 weeks, from about 2 weeks to about 15 weeks, from about 2 weeks to about 16 weeks, from about 3 weeks to about 5 weeks, from about 3 weeks to about 6 weeks, from about 3 weeks to about 7 weeks, from about 3 weeks to about 8 weeks, from about 3 weeks to about 9 weeks, from about 3 weeks to about 10 weeks, from about 3 weeks to about 11 weeks, from about 3 weeks to about 12 weeks, from about 3 weeks to about 13 weeks, from about 3 weeks to about 14 weeks, from about 3 weeks to about 15 weeks, from about 3 weeks to about 16 weeks, from about 4 weeks to about 5 weeks, from about 4 weeks to about 6 weeks, from about 4 weeks to about 7 weeks, from about 4 weeks to about 8 weeks, from about 4 weeks to about 9 weeks, from about 4 weeks to about 10 weeks, from about 4 weeks to about 11 weeks, from about 4 weeks to about 12 weeks, from about 4 weeks to about 13 weeks, from about 4 weeks to about 14 weeks, from about 4 weeks to about 15 weeks, from about 4 weeks to about 16 weeks, from about 5 weeks to about 6 weeks, from about 5 weeks to about 7 weeks, from about 5 weeks to about 8 weeks, from about 5 weeks to about 9 weeks, from about 5 weeks to about 10 weeks, from about 5 weeks to about 11 weeks, from about 5 weeks to about 12 weeks, from about 5 weeks to about 13 weeks, from about 5 weeks to about 14 weeks, from about 5 weeks to about 15 weeks, from about 5 weeks to about 16 weeks, from about 6 weeks to about 7 weeks, from about 6 weeks to about 8 weeks, from about 6 weeks to about 9 weeks, from about 6 weeks to about 10 weeks, from about 6 weeks to about 11 weeks, from about 6 weeks to about 12 weeks, from about 6 weeks to about 13 weeks, from about 6 weeks to about 14 weeks, from about 6 weeks to about 15 weeks, from about 6 weeks to about 16 weeks, from about 7 weeks to about 8 weeks, from about 7 weeks to about 9 weeks, from about 7 weeks to about 10 weeks, from about 7 weeks to about 11 weeks, from about 7 weeks to about 12 weeks, from about 7 weeks to about 13 weeks, from about 7 weeks to about 14 weeks, from about 7 weeks to about 15 weeks, from about 7 weeks to about 16 weeks, from about 8 weeks to about 9 weeks, from about 8 weeks to about 10 weeks, from about 8 weeks to about 11 weeks, from about 8 weeks to about 12 weeks, from about 8 weeks to about 13 weeks, from about 8 weeks to about 14 weeks, from about 8 weeks to about 15 weeks, from about 8 weeks to about 16 weeks, from about 9 weeks to about 10 weeks, from about 9 weeks to about 11 weeks, from about 9 weeks to about 12 weeks, from about 9 weeks to about 13 weeks, from about 9 weeks to about 14 weeks, from about 9 weeks to about 15 weeks, from about 9 weeks to about 16 weeks, from about 10 weeks to about 11 weeks, from about 10 weeks to about 12 weeks, from about 10 weeks to about 13 weeks, from about 10 weeks to about 14 weeks, from about 10 weeks to about 15 weeks, from about 10 weeks to about 16 weeks, from about 11 weeks to about 12 weeks, from about 11 weeks to about 13 weeks, from about 11 weeks to about 14 weeks, from about 11 weeks to about 15 weeks, from about 11 weeks to about 16 weeks, from about 12 weeks to about 13 weeks, from about 12 weeks to about 14 weeks, from about 12 weeks to about 15 weeks, from about 12 weeks to about 16 weeks, from about 13 weeks to about 14 weeks, from about 13 weeks to about 15 weeks, from about 13 weeks to about 16 weeks, from about 14 weeks to about 15 weeks, from about 14 weeks to about 16 weeks, or from about 15 weeks to about 16 weeks.

In some embodiments, the gel degrades over a period of about 1 day. In some embodiments, the gel degrades over a period of about 2 days, about 3 days, about 4 days, about 5 days, about 9 days, about 1 week, about 2 weeks, about 3 weeks, or about 4 weeks. In some embodiments, the gel degrades over a period of about 5 weeks, about 6 weeks, about 7 weeks, about 8 weeks, about 9 weeks, about 10 weeks, about 11 weeks, about 12 weeks, about 13 weeks, about 14 weeks, about 15 weeks, or about 16 weeks.

Figure 15:
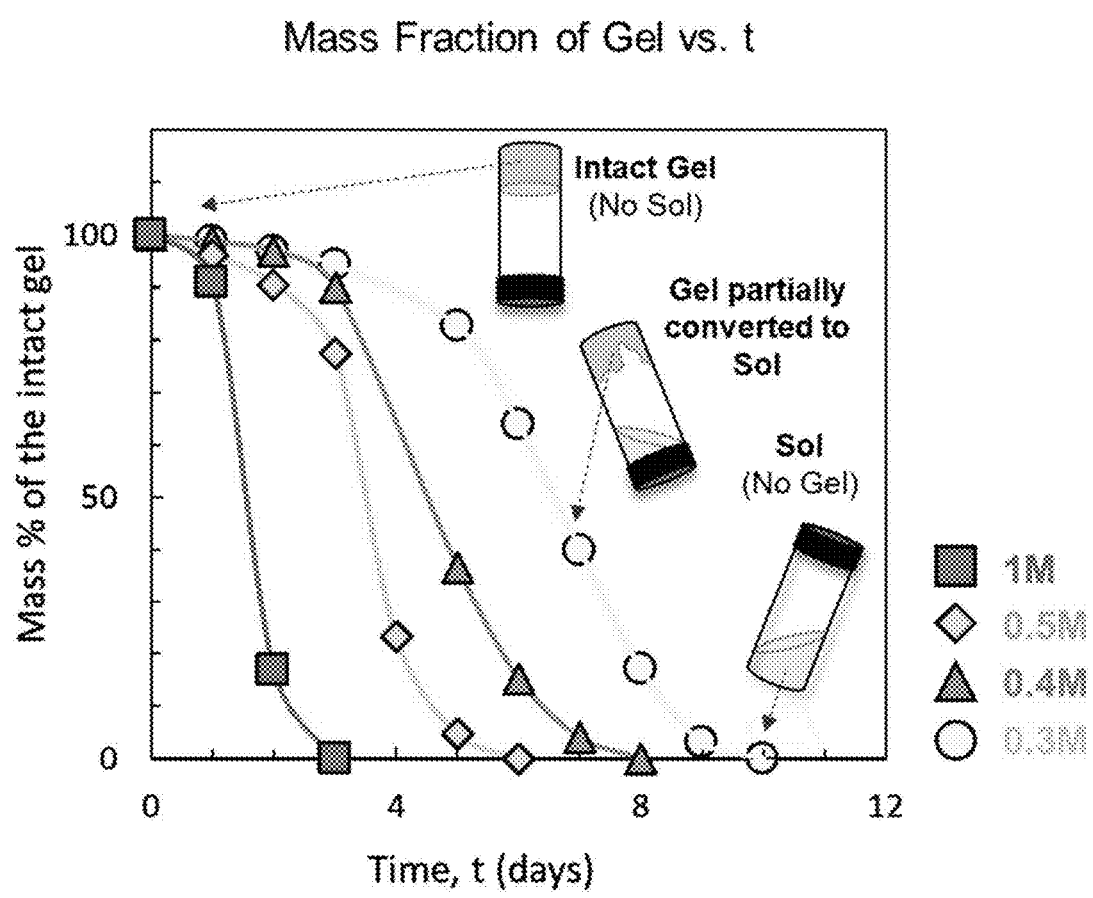
FIG. 15 is a scatter plot showing the % mass of a DBS gel still intact after addition of 0.3 M, 0.4 M, 0.5 M, or 1 M of aqueous hydrochloric acid (HCl) over time.
Figure 16:
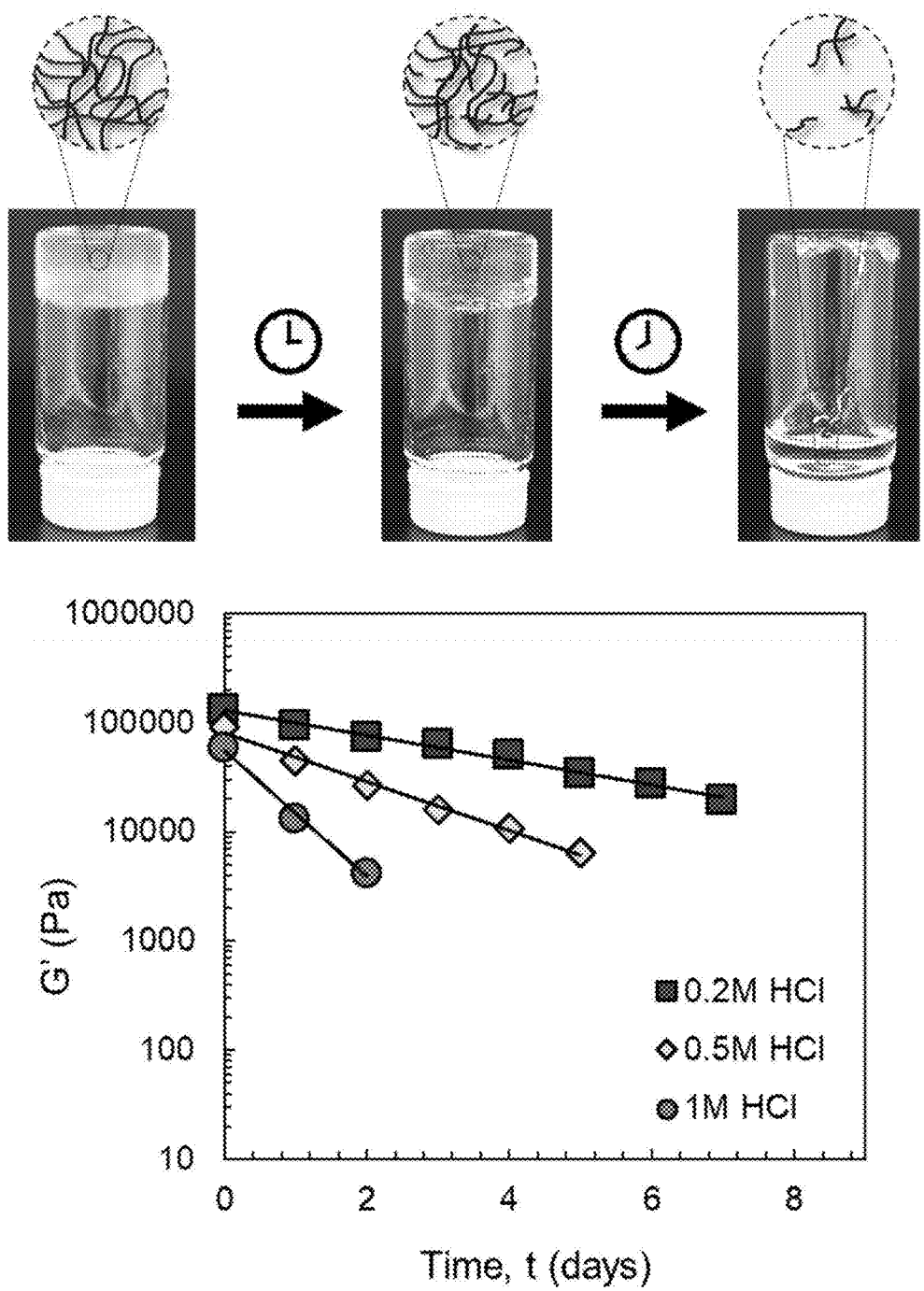
FIG. 16 is a schematic showing the degradation of a DBS gel over time (top) and a scatter plot showing G' as a function of time for DBS gels with 0.2 M, 0.5 M, or 1 M of HCl added.

The degradation time can be easily tuned by various parameters, including, but not limited to, the acid content and the temperature. The higher the acid concentration or temperature, the faster the degradation. The effect of the acid content, i.e., [HCl], was studied, as shown in FIGS. 15 and 16. Gels of 2% DBS in 80/20 PEG/acid solution were made, with the molarity of the acid varying from 0.2 to 1 M. In all cases, the gels were incubated at 30° C. and the mass fraction of intact gel $m_{gel}$ (co-existing with the sol) was measured over time. FIG. 15 shows that $m_{gel}$ drops to zero over a period of days, and the higher the acid content, the faster this drop. The curves all exhibit an inverse-sigmoidal shape with an initial lag in $m_{gel}$ followed by a sharp drop and then a plateau to zero. The degradation time $t_{degr}$ can be defined as the time for the gel to degrade completely (i.e., when $m_{gel}=0$) or the time at the mid-point of the sigmoidal curve (i.e., when $m_{gel}=50\%$). In either case, $t_{degr}$ decreases as [HCl] increases. For example, if [HCl]=0.3 M in the aqueous phase, $t_{degr}$ (for $m_{gel}=0$) is 10 days, whereas if [HCl]=1 M, $t_{degr}$ (for $m_{gel}=0$) is just 3 days.

The rheology of the intact gel portion in the above experiments as the gel degraded was also studied. The modulus G' of the intact gel was measured over time, as shown in FIG. 16 (bottom). G' is found to decrease exponentially with time t (to reveal the exponential nature of the decay, the data are shown as semilog plots of G' vs t, with the data falling on straight lines). Also, the higher the [HCl], the faster the decay in G', i.e., the higher the slope in the semilog plots.

Figure 17:
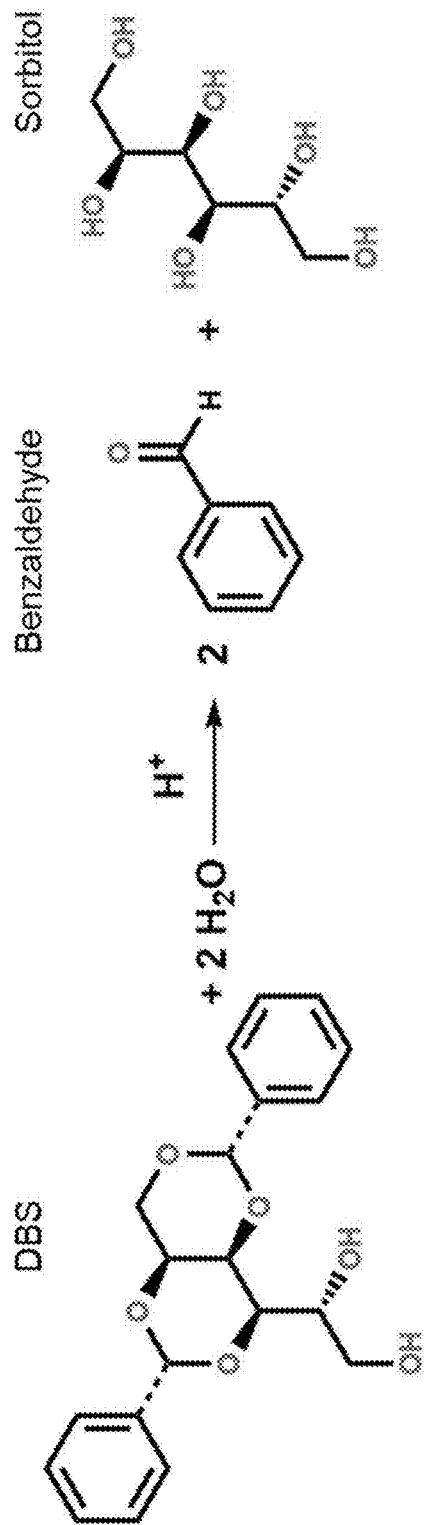
FIG. 17 is a set of chemical structures showing the degradation of DBS in acid to form benzaldehyde and sorbitol (top) and a set of photographs showing the degradation of pure DBS in 2 M HCl over time (bottom).
Figure 17:
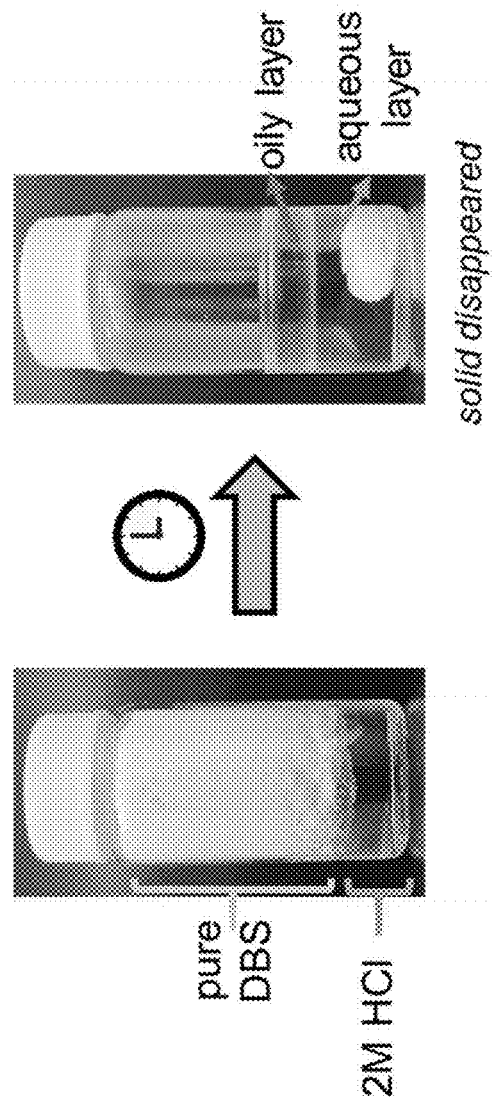
Figure 18:
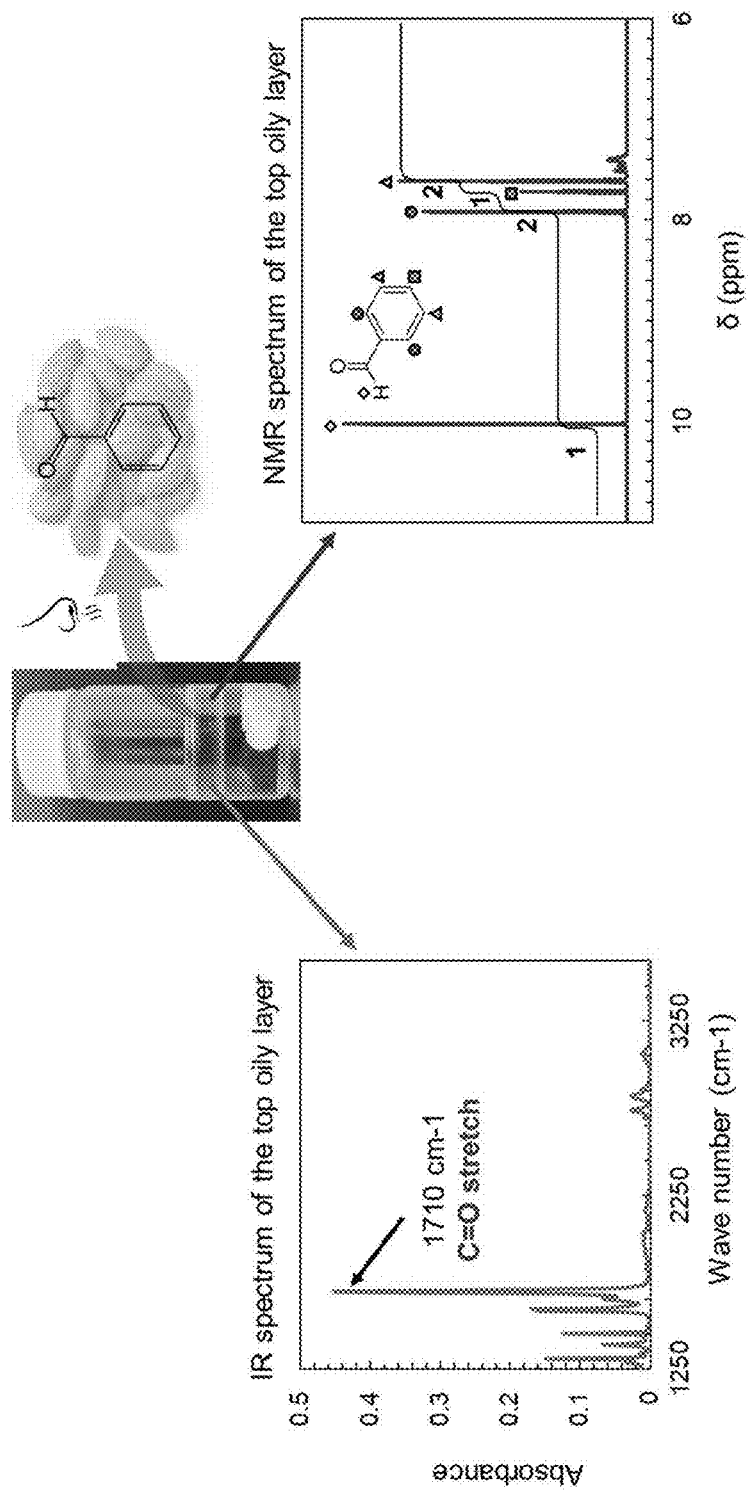
FIG. 18 is a set of line graphs showing an infrared spectroscopy spectrum of the top oily layer of DBS that has been degraded by HCl (left) and a $^1H$ nuclear magnetic resonance (NMR) spectrum of the top oily layer of DBS that has been degraded by HCl (right).
Figure 19:
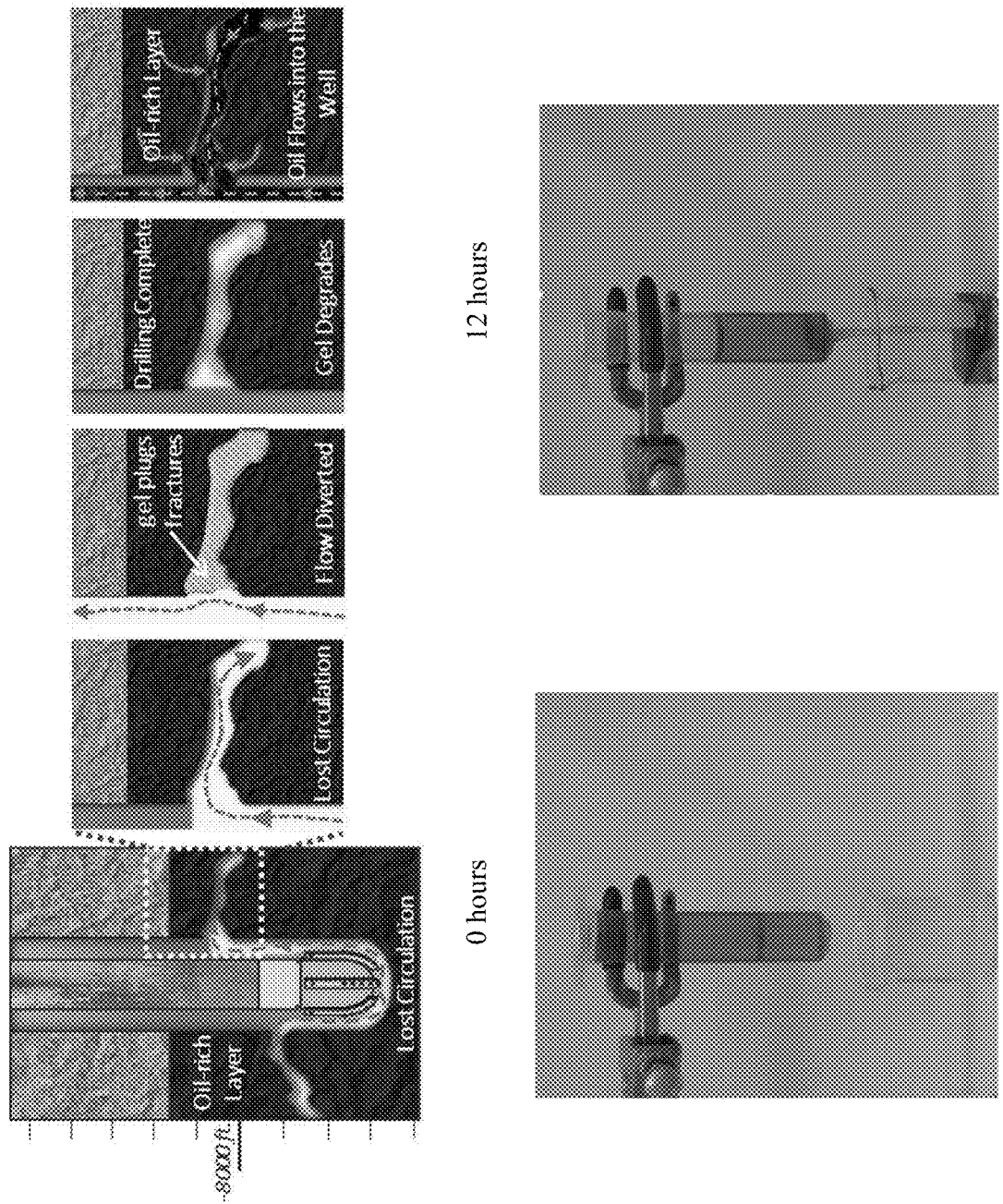
FIG. 19 is a schematic showing how lost circulation materials, e.g., the self-degrading gels described herein, are used to plug fractures in boreholes (top) and a set of photographs (bottom) showing how a self-degrading DBS gel (bottom layer in left photograph) can stop the flow of mineral oil (top layer in left photograph) for a period of about 12 hours.

To elucidate the reaction mechanism, the experiment shown in FIG. 17 (bottom) was performed. 5 g of solid DBS powder was placed atop 5 g of an aqueous solution of 2 M HCl and left to sit at 70° C. Over time (~48 h), all the solid disappeared, leaving two liquid phases: a top oily phase and a bottom aqueous phase. The top phase was examined using Fourier-Transform Infrared (FTIR) spectroscopy. A carbonyl (C=O) peak is clearly seen in the spectrum, shown in FIG. 18 (left). Neither the DBS nor the aqueous HCl contains a carbonyl group, which implies that the carbonyl is coming from a reaction product.

The top phase was further examined using nuclear magnetic resonance (NMR) spectroscopy. From the NMR spectrum (FIG. 18, right), the presence of benzaldehyde was identified, which is a molecule with carbonyl (C=O) groups. This helps to clarify the reaction between DBS and acid. DBS molecules contain acetal groups (see structure in FIG. 17, top left). In organic synthesis, acetals are often used as protecting groups as they are stable to strong bases and nucleophiles but hydrolyze under acidic conditions. Without wishing to be bound by theory, it is believed that DBS is likely being hydrolyzed by the acid, forming benzaldehyde and sorbitol, as shown in the reaction scheme in FIG. 17 (top). Sorbitol does not show up in the NMR spectrum because it is hydrophilic and hence would likely partition into the aqueous phase shown in FIG. 17 (bottom right). Neither benzaldehyde nor sorbitol can self-assemble into nanofibrils, which explains why the gel degrades.

Figure 7:
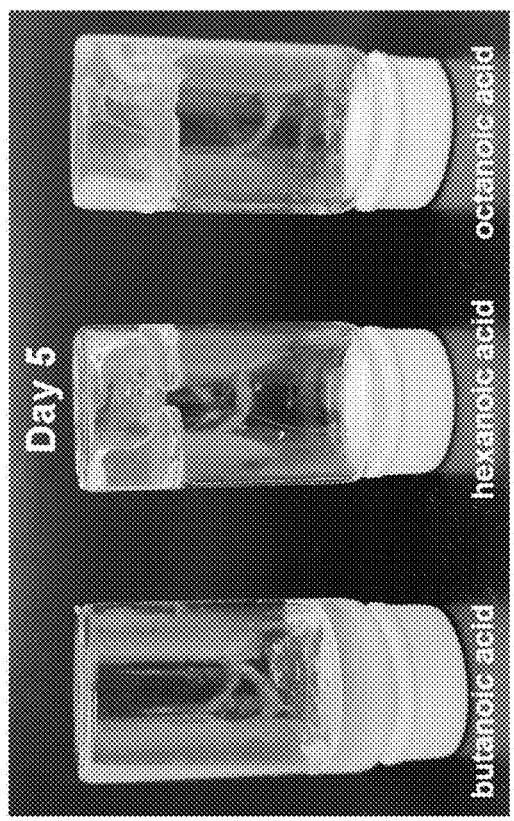
FIG. 7 is a set of two photographs showing clear DBS gels degrading over several days due to the presence of an organic acid (butanoic acid, hexanoic acid, or octanoic acid). The gels were made with mineral oil containing 20 wt. % organic acid. The DBS concentration in the gel was 0.5 wt. % and the experiment was carried out at 65° C.
Figure 7:
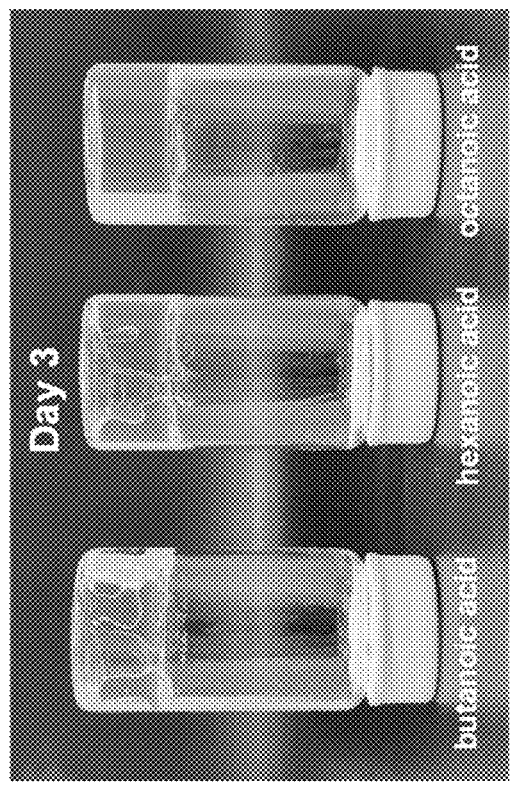
Figure 9:
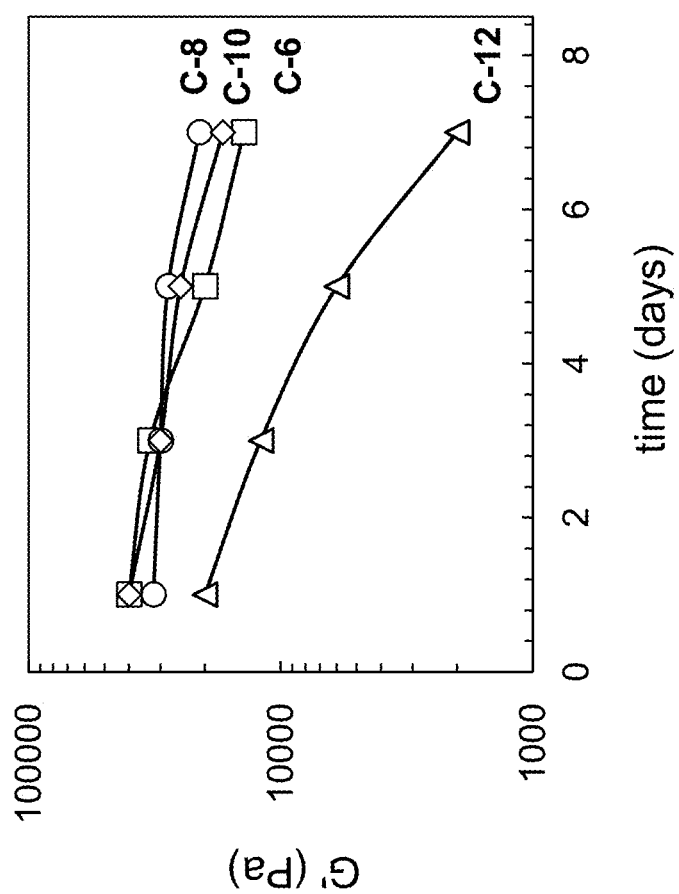
FIG. 9 is a line graph showing the decrease in elastic modulus (G') over time as the DBS gel is degraded in the presence of C-8. C-10, C-6, or C-12 fatty acid.
Figure 10:
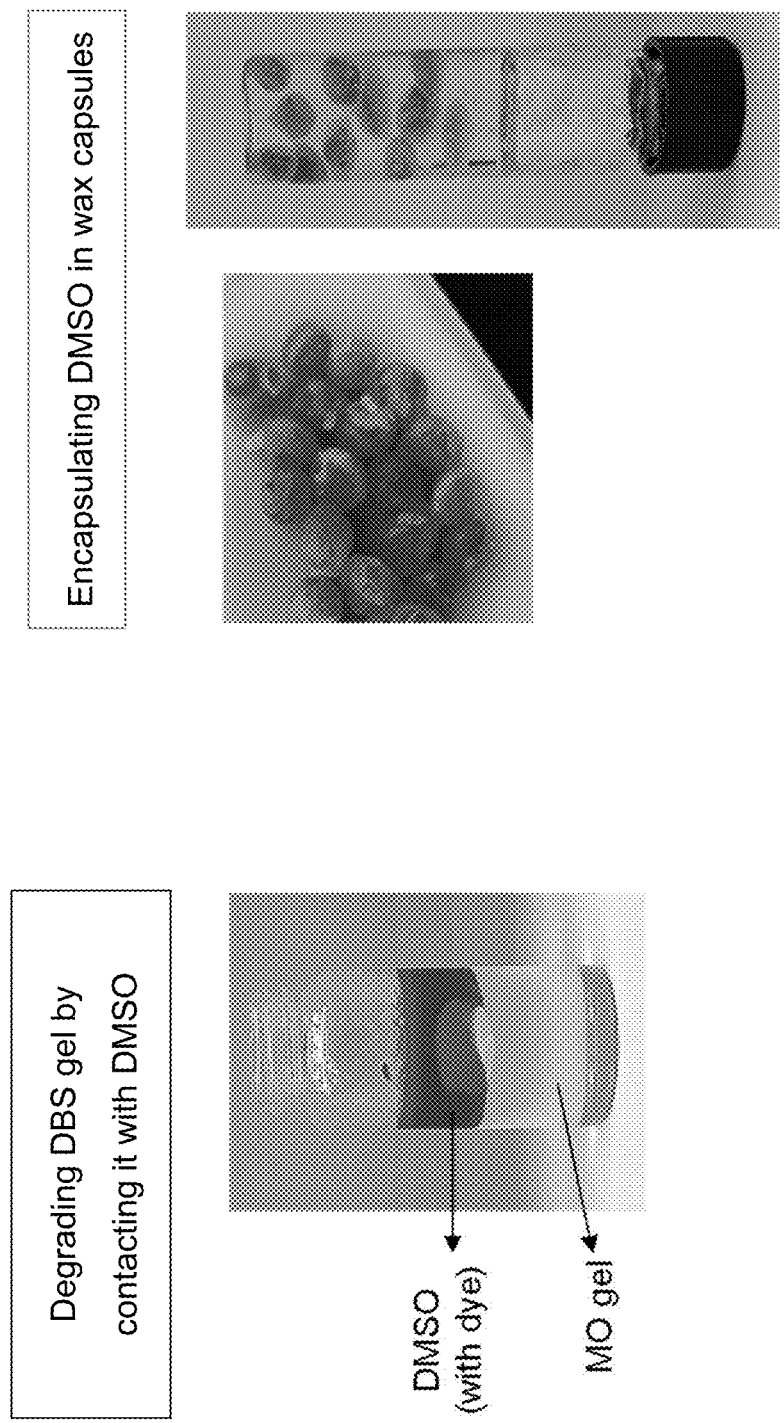
FIG. 10 is a set of three photographs showing the degradation of DBS gels by contacting the gel with DMSO, including encapsulation of DMSO in wax capsules.

Further findings revealed that the DBS gels can be degraded in the absence of water. If a pure organic acid is added to the DBS gel, it still degrades. The use of organic acids offers two advantages over the emulsion gel. First, the gels that are formed are homogeneous, and second, the use of an organic acid eliminates the need for a cosolvent. Since the organic acid can be directly dissolved in the oil phase, the system is a single phase. This is useful because, for a two-phase system, a consistent preparation method is beneficial because the emulsion droplets could have a significant effect on the gel strength and the degradation time. Moreover, longer chain aliphatic organic acids are directly soluble in mineral oil. The organic acids can serve as both the degrading agent and the cosolvent. Hence, a self-degrading organogel can be easily made with fewer components. Like emulsion gels, the degradation time decreases with the increase in the acid concentration. The type of organic acid may also have an effect on degradation time. FIG. 7 shows that the gel with the butanoic acid degrades faster than the gel with hexanoic acid, which degrades faster than the gel with octanoic acid. In this experiment, the mass-based concentration of each acid is the same (20 wt. %), meaning that the molar concentration of the longer chain fatty acid is lower and may be the reason behind the slower degradation rate.

FIG. 7 shows self-degradable organogels. The figure shows clear DBS gels degrading over a course of several days due to presence of an organic acid. The gels were made with mineral oil containing 20 wt. % organic acid. The DBS concentration in the gel was 0.5 wt. % and the experiment was carried out at 65° C.

The elastic modulus, G' of the self-degrading organogel was also measured as a function of time. As expected, the G' value decreased over time due to the degradation of DBS. The concept of the self-degrading organogel is shown schematically in FIG. 8A. Depending on the type and concentration of the acid, the life of the gel can be controlled. FIG. 8B shows the drop in G' values of the DBS gel containing 20 wt. % hexanoic acid over one week. The DBS gels can also be degraded in presence of a solid Lewis acid such as $AlCl_3$. Hence, a self-degrading organogel can be prepared by dispersing the particles of the solid acid in the gel. The synthesis of a self-degrading organogel as a novel lost circulation material has been demonstrated by the incorporation of acids. As this material may also effectively plug leaks in contexts other than drilling, it may also be referred to more generally as a "plugging material." The same concept can also be achieved with various DBS derivatives (e.g. methyl-DBS or dimethyl-DBS).

In some embodiments, the plugging material can be used as a plugging agent in subsurface applications. In some embodiments, the subsurface application is completion, remediation, intervention, or production.

The plugging material may also be used to improve recovery of reservoir fluid from a fracture or pore space within a rock formation. Reservoir fluid may be trapped inside fractures or pore spaces when plugged by the plugging material. Once the plugging material degrades, these fluids can be recovered. In contrast, if a non-reversible/non-degradable plugging material is used, these fluids are unlikely to be recovered.

FIG. 8 shows the concept of self-degrading gel. A) In presence of an acid, DBS is chemically degraded. Eventually, the gel is converted to a thin solution. B) As the DBS is degraded, the elastic modulus of the gel is dropped. The G' value is shown for the gel containing 0.5 wt. % DBS and 20 wt. % hexanoic acid. The experiment was performed at 65° C.

The degradation rate of the DBS gel is a function of the type of acid, the concentration of the acid, and temperature. Through systematic experiments, the relationships between degradation rate and the above variables may be studied. Based on such 'formulas', it will be possible to 'dial in' the degradation time. For example, to ensure that a gel degrades after 7 days at a temperature of 65° C., the formula described herein may suggest the use of a particular organic acid (e.g., hexanoic acid) at a specific concentration. Preliminary results show that the DBS gel also degrades in presence of a solid Lewis acid, aluminum chloride. Degradation using environmentally friendly particulate Lewis acids dispersed in the gel may also be studied. Rheology experiments to obtain plots of G' as a function of time may also be conducted. Rheological studies can also be used to correlate with flow-blocking experiments. That is, the DBS gels may be designed to be strong enough to block flow.

Figure 11:
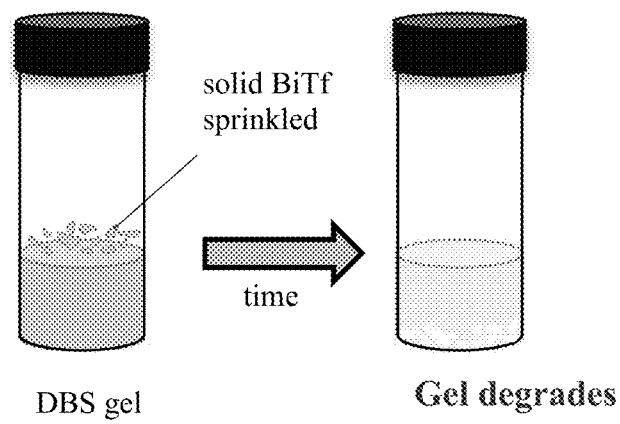
FIG. 11 is a schematic showing the degradation of a DBS gel that has had bismuth(III) triflate (BiTf) sprinkled on its surface (top) and a set of photographs showing the difference between a DBS gel that has not been treated with BiTf (bottom left) and a DBS gel that has been treated with BiTf (bottom right) after 12 hours.
Figure 11:
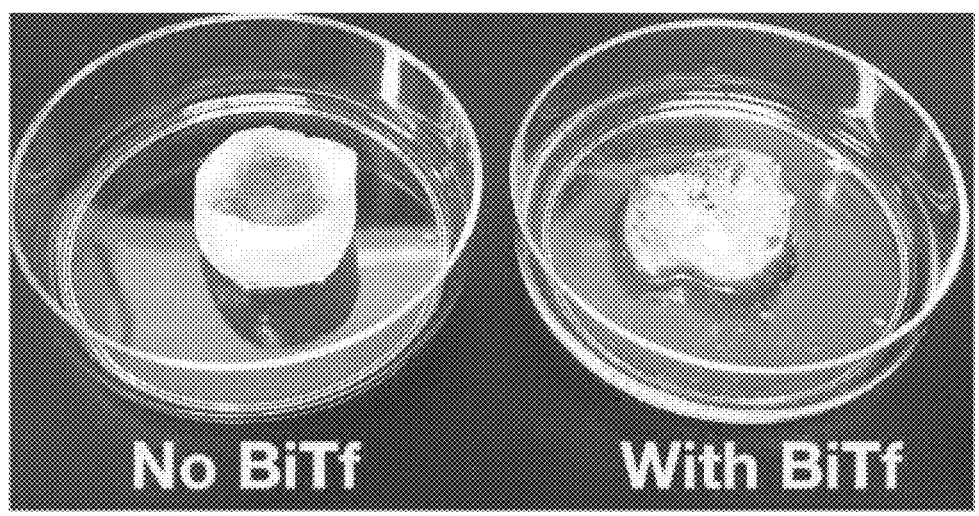
Figure 12:
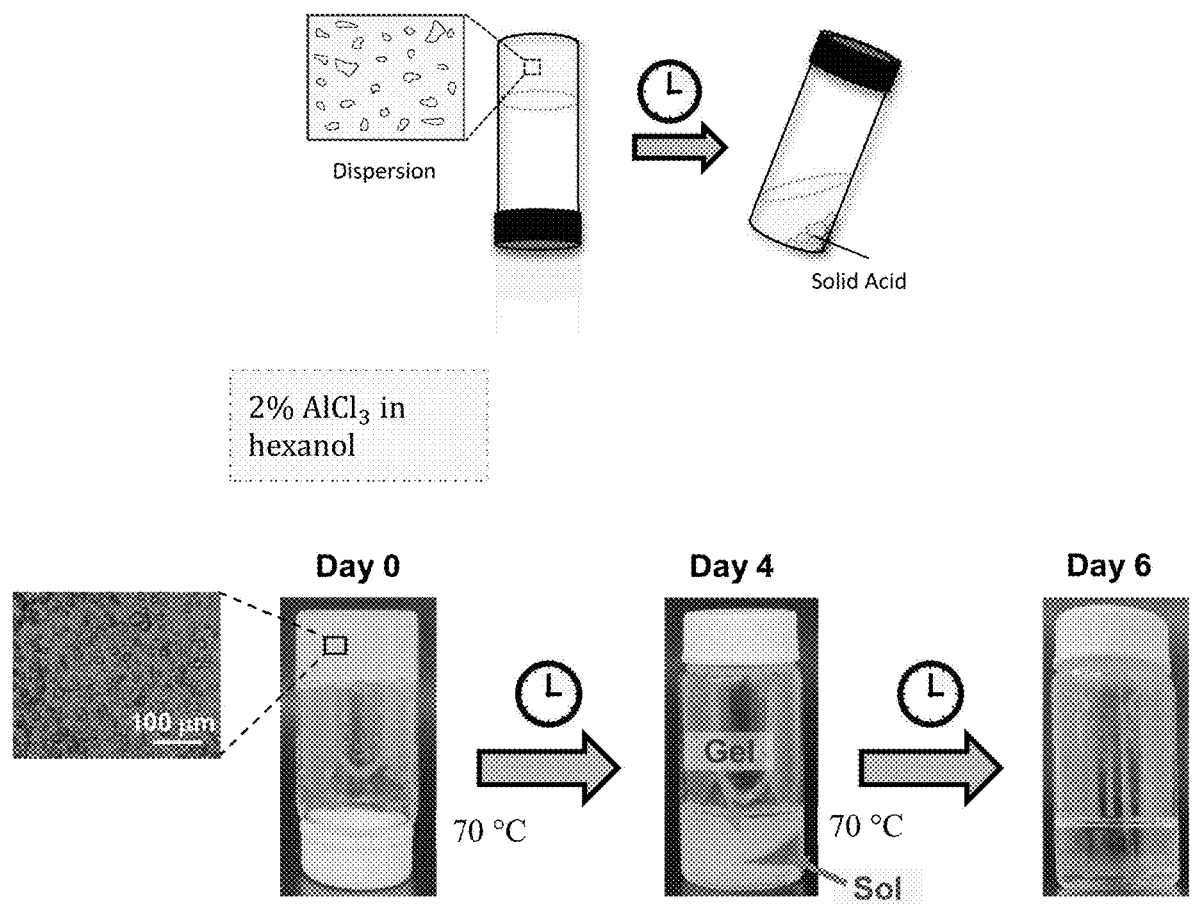
FIG. 12 is a schematic showing the degradation of a DBS gel that has aluminum(III) chloride ($AlCl_3$) dispersed within (top) and a set of photographs showing the degradation of a DBS gel having $AlCl_3$ dispersed within over a period of six days at a temperature of 70° C.

In some embodiments, the Lewis acid acts as a catalyst. As shown in FIG. 11, addition of a Lewis acid, e.g., bismuth(III) triflate, can accelerate degradation of a DBS gel. In some embodiments, the Lewis acid is aluminum(III) chloride or bismuth(III) triflate. Other Lewis acids are known to those of skill in the art.

Moreover, a similar strategy can be used to gel water. Low molecular weight gelators, including DBS, can form good hydrogels with a cosolvent. Hence, this approach may be extended to make self-degrading water-based gels.

Other solvents besides or in addition to DMSO may be used to form the gel, including, but not limited to, dihydrolevoglucosenone (cyrene), dimethylformamide (DMF), and N-methyl-2-pyrrolidone (NMP).

The concentration of various components of the self-degrading gel may be varied. In some embodiments, the concentration of the gelator is from about 2 wt. % to about 4 wt. %. In some embodiments, the concentration of the gelator is from about 0.25 wt. % to about 15 wt. %, from about 1 wt. % to about 10 wt. %, from about 2 wt. % to about 8 wt. %, or from about 3 wt. % to about 5 wt. %.

In some embodiments, the concentration of the gelator is about 2 wt. %. In some embodiments, the concentration of the gelator is about 0.25 wt. %, about 0.5 wt. %, about 0.75 wt. %, about 1 wt. %, about 2 wt. %, about 3 wt. %, about 4 wt. %, about 5 wt. %, about 6 wt. %, about 7 wt. %, about 8 wt. %, about 9 wt. %, about 10 wt. %, about 11 wt. %, about 12 wt. %, about 13 wt. %, about 14 wt. %, or about 15 wt. %.

In some embodiments, the concentration of mineral oil is from about 20 wt. % to about 80 wt. %, from about 30 wt. % to about 80 wt. %, from about 40 wt. % to about 80 wt. %, from about 50 wt. % to about 80 wt. %, from about 60 wt. % to about 80 wt. %, from about 70 wt. % to about 80 wt. %, from about 20 wt. % to about 70 wt. %, from about 30 wt. % to about 70 wt. %, from about 40 wt. % to about 70 wt. %, from about 50 wt. % to about 70 wt. %, from about 60 wt. % to about 70 wt. %, from about 20 wt. % to about 60 wt. %, from about 30 wt. % to about 60 wt. %, from about 40 wt. % to about 60 wt. %, from about 50 wt. % to about 60 wt. %, from about 20 wt. % to about 50 wt. %, from about 30 wt. % to about 50 wt. %, from about 40 wt. % to about 50 wt. %, from about 20 wt. % to about 40 wt. %, or from about 20 wt. % to about 30 wt. %.

In some embodiments, the concentration of mineral oil is about 50 wt. %. In some embodiments, the concentration of mineral oil is about 10 wt. %, about 20 wt. %, about 30 wt. %, about 40 wt. %, about 60 wt. %, about 70 wt. %, about 80 wt. %, or about 90 wt. %.

In some embodiments, the concentration of acid is from about 20 wt. % to about 80 wt. %, from about 30 wt. % to about 80 wt. %, from about 40 wt. % to about 80 wt. %, from about 50 wt. % to about 80 wt. %, from about 60 wt. % to about 80 wt. %, from about 70 wt. % to about 80 wt. %, from about 20 wt. % to about 70 wt. %, from about 30 wt. % to about 70 wt. %, from about 40 wt. % to about 70 wt. %, from about 50 wt. % to about 70 wt. %, from about 60 wt. % to about 70 wt. %, from about 20 wt. % to about 60 wt. %, from about 30 wt. % to about 60 wt. %, from about 40 wt. % to about 60 wt. %, from about 50 wt. % to about 60 wt. %, from about 20 wt. % to about 50 wt. %, from about 30 wt. % to about 50 wt. %, from about 40 wt. % to about 50 wt. %, from about 20 wt. % to about 40 wt. %, or from about 20 wt. % to about 30 wt. %.

In some embodiments, the concentration of acid is about 50 wt. %. In some embodiments, the concentration of acid is about 10 wt. %, about 20 wt. %, about 30 wt. %, about 40 wt. %, about 60 wt. %, about 70 wt. %, about 80 wt. %, or about 90 wt. %.

Figure 25:
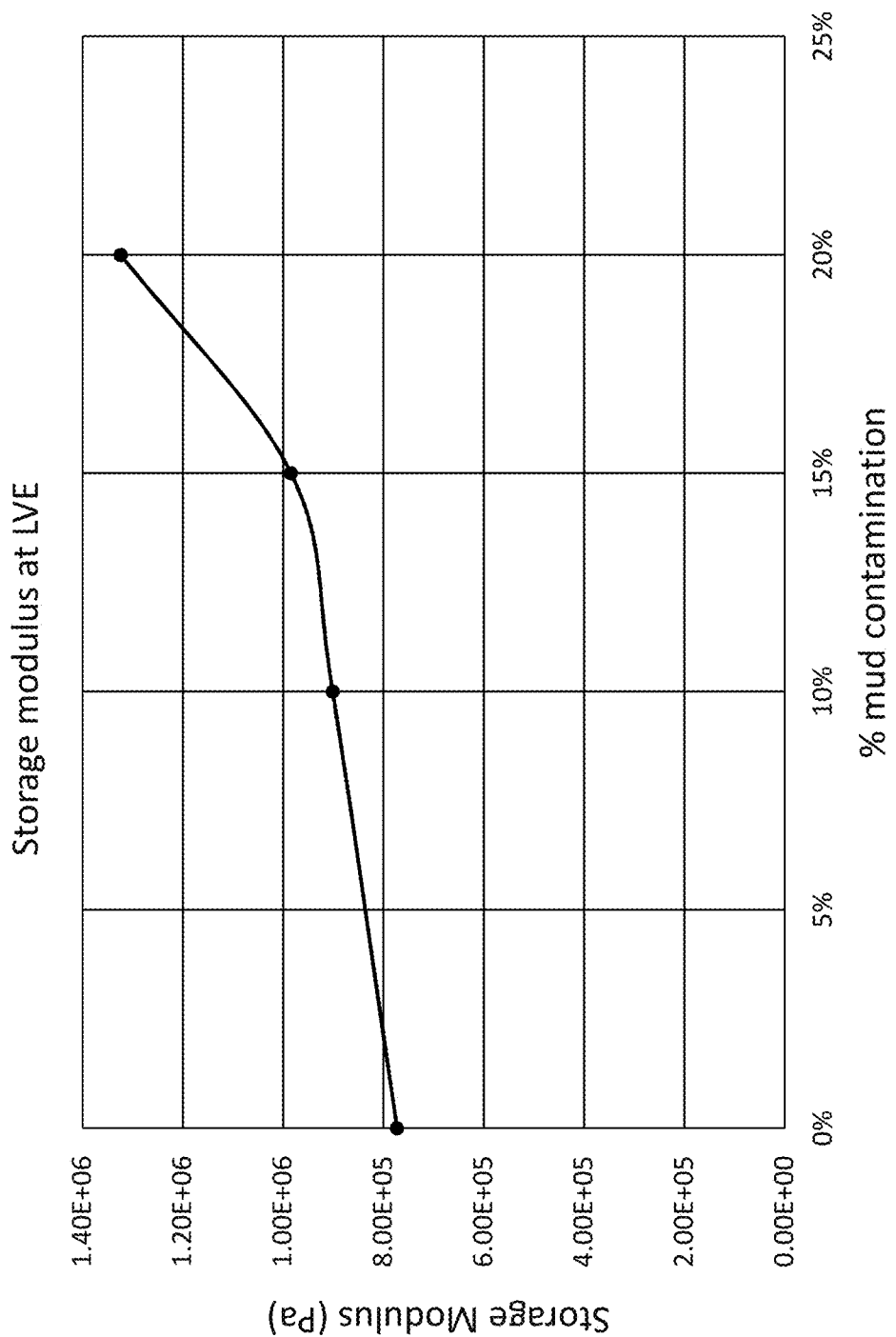
FIG. 25 is a line graph showing the storage modulus of DBS gels as a function of the concentration of mud contaminant.

In some embodiments, the strength of the gel can be altered by the presence of one or more additives. In some embodiments, the gel strength is increased by the presence of the one or more additives. In some embodiments, the gel strength is decreased by the presence of the one or more additives. In some embodiments, the additive is a solid. In some embodiments, the additive is a polymer. The polymer may be a synthetic polymer or a biopolymer. In some embodiments, the additive is drilling mud or a component of the drilling mud. As shown in FIG. 25, the presence of increasing amounts of drilling mud in a DBS gel results in an increased storage modulus in the LVE region, indicating an increase in gel strength.

The foregoing description of the specific aspects will fully reveal the general nature of the disclosure that others can, by applying knowledge within the skill of the art, readily modify and/or adapt for various applications such specific aspects, without undue experimentation, and without departing from the general concept of the present disclosure.

Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance of the present disclosure.

The breadth and scope of the present disclosure should not be limited by any of the above-described exemplary aspects, but should be defined only in accordance with the claims that follow below and the equivalents of such claims.

What is claimed is:

1. A self-degrading gel composition, comprising
    a liquid,
    a gelator, wherein the gelator is dibenzylidene sorbitol (DBS), methyl dibenzylidene sorbitol (methyl-DBS), dimethyl dibenzylidene sorbitol (dimethyl-DBS), any other functional derivative of dibenzylidene sorbitol, or a combination thereof, and
    a degrading agent, wherein the degrading agent comprises one or more acids at a concentration at or above 20 wt. %, and wherein the degrading agent degrades the gelator over time.

2. The self-degrading gel composition of claim 1, wherein the concentration of the gelator is from about 0.25 wt. % to about 15 wt. %.

3. The self-degrading gel composition of claim 1, wherein the one or more acids is a mineral acid, an organic acid, a Lewis acid, or a combination thereof.

4. The self-degrading gel composition of claim 1, wherein the self-degrading gel composition further comprises a solvent.

5. The self-degrading gel composition of claim 4, wherein the solvent is dimethylsulfoxide (DMSO), dihydrolevoglucosenone (cyrene), dimethylformamide (DMF), N-methyl-2-pyrrolidone (NMP), or a combination thereof.

6. The self-degrading gel composition of claim 5, wherein the solvent is DMSO, and wherein a portion of the DMSO is encapsulated in wax particles.

7. The self-degrading gel composition of claim 1, wherein the liquid comprises an oil-based liquid or a water-based liquid.

8. A method of preventing loss of a fluid within a rock formation, comprising the steps of:
    injecting the fluid into a borehole of the rock formation; and
    injecting a plugging material into the borehole,
    wherein the plugging material is a self-degrading gel composition, comprising
    a liquid,
    a gelator, wherein the gelator is dibenzylidene sorbitol (DBS), methyl dibenzylidene sorbitol (methyl-DBS), dimethyl dibenzylidene sorbitol (dimethyl-DBS), any other functional derivative of dibenzylidene sorbitol, or a combination thereof, and
    a degrading agent, wherein the degrading agent comprises one or more acids at a concentration at or above 20 wt. %, and wherein the degrading agent degrades the gelator over time, and
    wherein the plugging material plugs a fracture or pore space within the rock formation.

9. The method of claim 8, wherein the loss occurs before, during, or after a drilling operation.

10. The method of claim 8, wherein the plugging material is a lost circulation material.

11. The method of claim 8, wherein the fluid is a drilling fluid.

12. The method of claim 8, wherein the plugging material is a self-degrading gel that degrades over time.

13. The method of claim 8, wherein the plugging material gels in a downhole portion of the borehole.

14. The method of claim 8, wherein the concentration of the gelator is from about 0.25 wt. % to about 15 wt. %.

15. The method of claim 8, wherein the plugging material further comprises a solvent.

16. The method of claim 8, wherein the liquid of the self-degrading gel composition is an oil-based liquid or a water-based liquid.

17. The method of claim 8, wherein the plugging material forms a gel without heating.

18. The method of claim 8, wherein the plugging of the fracture is reversible.

* * * * *